United States Patent
Ahmad et al.

(10) Patent No.: US 7,385,372 B2
(45) Date of Patent: Jun. 10, 2008

(54) AUXILIARY BUS SYSTEM

(75) Inventors: Raed H. Ahmad, Alpharetta, GA (US); Ekkehard Pittius, Roth (DE)

(73) Assignees: Siemens Energy & Automation, Inc., Alpharetta, GA (US); Siemens Atkiengesellschaft, Munich (DE)

( * ) Notice: Subject to any disclaimer, the term of this patent is extended or adjusted under 35 U.S.C. 154(b) by 0 days.

(21) Appl. No.: 11/139,850

(22) Filed: May 27, 2005

(65) Prior Publication Data

US 2006/0001319 A1    Jan. 5, 2006

Related U.S. Application Data

(60) Provisional application No. 60/574,958, filed on May 27, 2004, provisional application No. 60/574,959, filed on May 27, 2004, provisional application No. 60/592,547, filed on Jul. 30, 2004.

(51) Int. Cl.
*H02P 21/00* (2006.01)
*B60K 6/00* (2007.10)
*B61C 3/00* (2006.01)

(52) U.S. Cl. ............... 318/811; 318/808; 318/139; 318/800; 318/376; 180/65.3; 180/165; 701/19

(58) Field of Classification Search .......... 318/808, 318/811, 139, 800, 376
See application file for complete search history.

(56) References Cited

U.S. PATENT DOCUMENTS

| | | | | |
|---|---|---|---|---|
| 3,743,901 A | * | 7/1973 | Johnson | 318/87 |
| 4,108,077 A | * | 8/1978 | Laing | 180/2.2 |
| 4,342,921 A | * | 8/1982 | Williams | 290/2 |
| 4,785,213 A | * | 11/1988 | Satake | 318/437 |
| 4,853,553 A | | 8/1989 | Hosie | 290/40 |
| 4,951,769 A | | 8/1990 | Kawamura | |
| 4,967,334 A | | 10/1990 | Cook | |
| 5,517,093 A | * | 5/1996 | Augustyniak et al. | 318/63 |
| 5,528,094 A | | 6/1996 | Hasebe | |
| 5,528,444 A | | 6/1996 | Cooke | |
| 5,552,977 A | | 9/1996 | Xu | |
| 5,629,596 A | | 5/1997 | Iijima | |
| 5,735,215 A | | 4/1998 | Tegeler | |

(Continued)

FOREIGN PATENT DOCUMENTS

DE    3822264    1/1990

(Continued)

OTHER PUBLICATIONS

Hafner F. et al.: "Electrical equipment of the Diesel impulse courses series 610 of the German Federal Railroads" Electrical courses, Oldenbourg, R., Munchen, DE vol. 91, No. 7, Jul. 1, 1993 pp. 228-236.*

(Continued)

*Primary Examiner*—Lincoln Donovan
*Assistant Examiner*—Eduardo Colon

(57) ABSTRACT

Certain exemplary embodiments can comprise a system comprising an electric drive system for a machine. The system can comprise a rectifier adapted to convert AC power from an alternator to DC power. The system can comprise an inverter adapted to receive DC power from the rectifier and provide power to a traction motor and/or auxiliary devices. Certain exemplary embodiments can comprise a system and method for dissipating excess energy from a machine.

24 Claims, 13 Drawing Sheets

U.S. PATENT DOCUMENTS

| | | | |
|---|---|---|---|
| 5,794,422 A | 8/1998 | Reimers | |
| 5,886,445 A | 3/1999 | Hsu | |
| 5,923,085 A | 7/1999 | Donegan | |
| 6,023,417 A | 2/2000 | Hava | |
| 6,186,254 B1 | 2/2001 | Mufford | |
| 6,229,722 B1 * | 5/2001 | Ichikawa et al. | 363/71 |
| 6,308,639 B1 * | 10/2001 | Donnelly et al. | 105/50 |
| 6,316,895 B1 | 11/2001 | Ramarathnam | |
| 6,408,766 B1 * | 6/2002 | McLaughlin et al. | 105/231 |
| 6,430,045 B1 | 8/2002 | Everitt | |
| 6,483,198 B2 | 11/2002 | Schmitz | |
| 6,486,568 B1 | 11/2002 | King | |
| 6,591,758 B2 | 7/2003 | Kumar | |
| 6,615,118 B2 | 9/2003 | Kumar | |
| 6,749,043 B2 | 6/2004 | Brown | |
| 6,803,734 B2 | 10/2004 | Kumar | |
| 6,819,078 B2 | 11/2004 | Ho | |
| 6,839,249 B2 | 1/2005 | Kalman | |
| 6,850,426 B2 | 2/2005 | Kojori | |
| 6,923,155 B2 | 8/2005 | Gottemoller | |
| 6,981,386 B2 | 1/2006 | Young | |
| 6,984,946 B2 * | 1/2006 | Donnelly et al. | 318/139 |
| 6,995,992 B2 * | 2/2006 | Wei et al. | 363/34 |
| 7,026,783 B2 * | 4/2006 | Eckardt | 318/254 |
| 2002/0172063 A1 | 11/2002 | Link | 363/132 |
| 2003/0133319 A1 | 7/2003 | Radosevich | |
| 2003/0151387 A1 * | 8/2003 | Kumar | 320/104 |
| 2003/0222611 A1 | 12/2003 | Kumar | |
| 2003/0230996 A1 | 12/2003 | Gabriel | |
| 2005/0072608 A1 | 4/2005 | Johnston | |
| 2005/0088855 A1 * | 4/2005 | Kirchmeier et al. | 363/17 |
| 2006/0022631 A1 | 2/2006 | Marsh | |
| 2006/0076171 A1 * | 4/2006 | Donnelly et al. | 180/65.2 |

FOREIGN PATENT DOCUMENTS

| | | |
|---|---|---|
| DE | 10027531 | 1/2001 |
| EP | 0925993 | 6/1999 |
| EP | 1186497 | 3/2002 |
| EP | 1219751 | 7/2002 |
| JP | 11136807 A | 5/1999 |
| WO | WO 98/11643 | 3/1998 |
| WO | WO 2005/119894 | 12/2005 |

OTHER PUBLICATIONS

German Article: "Electric Equipment for Diesel Multiple Units of the 610 Class of The German National Railways" Autor: Franz Haefner et al. Source: 398 EB Electronic Railways, 91 Jul. 1993, No. 7, Munich, Federal Republic of Germany <<<<<<<<<< Copyright Restriction >>>>>>>>>>>>>>>>>>> Only the 1st Page is provided.*

PCT International Search Report—mailed Oct. 14, 2005.

PCT Written Opinion.

Hafner F. et al.: "Elektrische Ausruestung Der Dieseltriebzuege Baureihe 610 Der Deutschen Bundesbahn", Elektrische Bahnen, Oldenbourg, R., Munchen, DE, vol. 91, No. 7, Jul. 1, 1993, pp. 228-236.

Lixiang Wei et al.: A Dual PWM Scheme for Three-level Voltage Source Converter System with IGBT Modules Industrial Electronics Society, 1998, vol. 2, pp. 755-760.

Fischer, J.W.: "AC Three-Phase Power Transmission System for Amtrak's New Locomotives F69PH-AC"; Joint-IEEE/ASME Railroad Conference,, Phila. Apr. 25-27, 1989, NY IEEE, US—Apr. 25, 1989, pp. 7-11.

Jovanovic, "An Optimal Direct Torque Control Strategy for Brushless Doubly-Fed Reluctance Motors", School of Engineering and Technology, Jan. 1, 1998, 6 page(s), Northunbria University.

Kwasinski, "Time Domain Comparison of Pulse-Width Modulation Schemes", IEEE Power Electronics Letters, Sep. 1, 2003, 5 page(s), Vol.[1] vol. 1, No. 3, IEEE.

* cited by examiner

AUXILIARY BUS SYSTEM

CROSS-REFERENCES TO RELATED APPLICATIONS

This application claims priority to, and incorporates by reference herein in its entirety, U.S. Provisional Patent Application Ser. No. 60/574,958 filed 27 May 2004, U.S. Provisional Patent Application Ser. No. 60/574,959, filed 27 May 2004, and U.S. Provisional Patent Application Ser. No. 60/592,547, filed 30 Jul. 2004.

BACKGROUND

Mining equipment, such as large off-road mining trucks and excavators (e.g., shovels, draglines, etc.) can use relatively large AC and/or DC motors to move the equipment and/or to move material. These motors can include propel motors, hoist motors, swing motors, and/or crowd motors. Such motors can be powered by conventional DC or AC electric drive systems. Such systems can include magnetic components, such as transformers, filters, reactors, etc., that can be of a significant size and/or weight.

Mining equipment can derive energy primarily from an internal combustion engine, which can be mechanically coupled to an alternator. The alternator can provide an AC signal, for example, to auxiliary devices. The alternator can provide the AC signal to an electrical system that can have different configurations and concepts. The operating frequency for the auxiliary loads electrically coupled to the alternator can be approximately 60 Hz.

Electrical systems can affect an idle speed of the internal combustion engine of the machine. Meeting auxiliary device power demand sometimes can involve maintaining a minimum engine speed above a level that might otherwise be possible. For example, a conventional drive system can result in an idle speed above approximately 1000 revolutions per minute (RPM) to adequately power the auxiliary devices in large mining trucks. The result of the elevated idle speed can be excessive use of fuel and/or higher maintenance expense of the diesel engine, thereby causing higher operational cost of the truck. Thus, there can be a need for a system and/or method that can efficiently power auxiliary systems.

Machines can utilize high power traction drive systems that can generate significant amounts of heat. As a result, there can be a need for effective cooling systems. Air-cooling can be used on machines where large volumes of air are moved using blowers to cool components such as the inverter power modules and traction motors. Limitations of conventional air-cooling systems can include limited power density and/or relatively large spatial footprints. Therefore, there can be a need for a cooling system that can provide greater power density and/or has a far smaller footprint than conventional air-cooled traction systems.

SUMMARY

Certain exemplary embodiments can comprise a system comprising an internal combustion engine mechanically coupled to an alternator. The alternator can be electrically coupled to a rectifier adapted to receive a first AC signal from the alternator. The rectifier can be electrically coupled to a DC bus and can provide a DC signal to the DC bus. The system can comprise an inverter electrically coupled to the DC bus. The inverter can be adapted to provide a second AC signal to a traction motor and/or an auxiliary device.

BRIEF DESCRIPTION OF THE DRAWINGS

A wide variety of potential embodiments will be more readily understood through the following detailed description, with reference to the accompanying drawings in which.

DEFINITIONS

Figure 1:
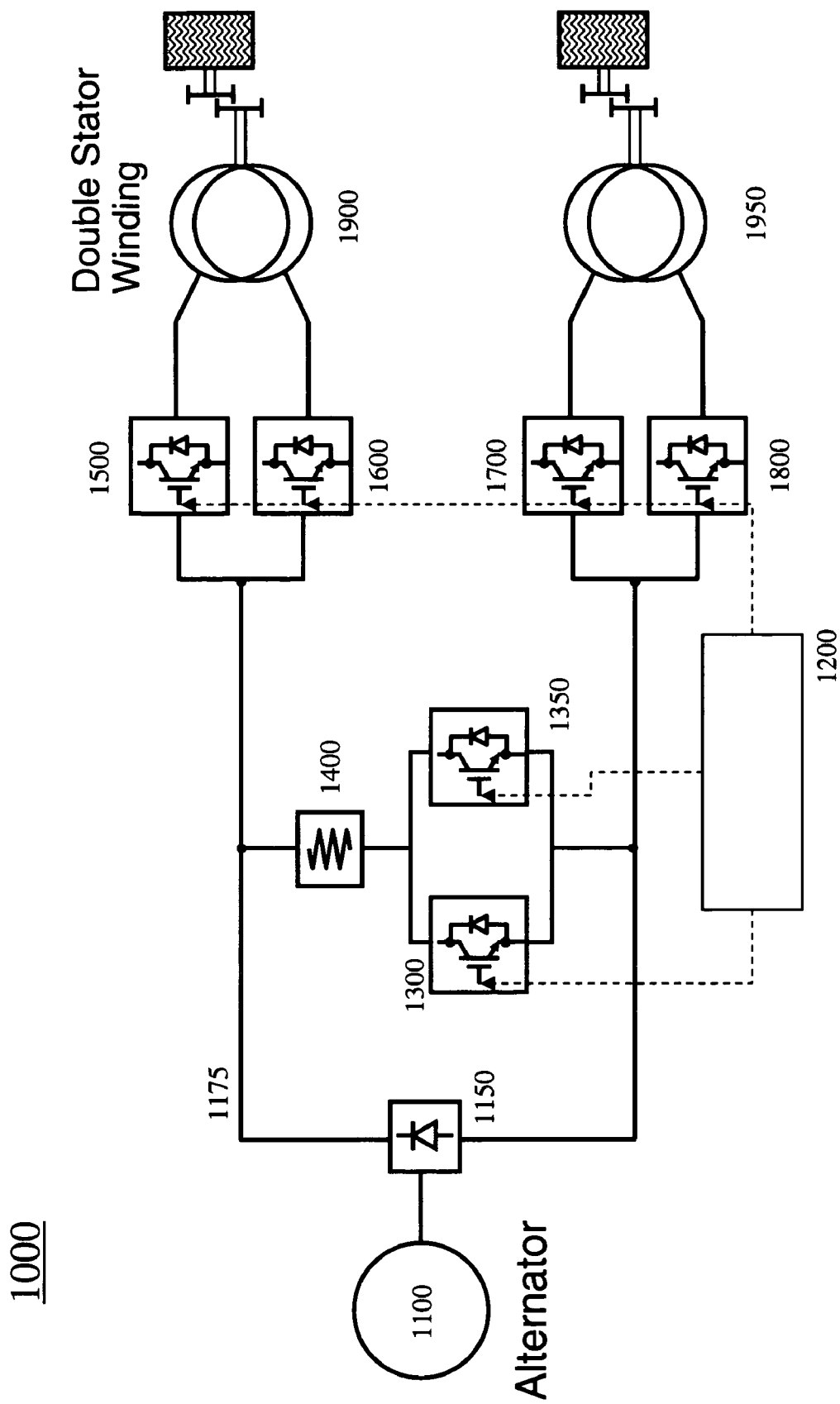
FIG. 1 is a block diagram of an exemplary embodiment of an energy management system 1000.

When the following terms are used herein, the accompanying definitions apply:

a—at least one.

active—a circuit and/or device that uses transistors, integrated circuits, and/or vacuum tubes to perform an action on an electrical source.

active front end—a self-commutated, actively controlled line converter; a self-commutated infeed/regenerative feedback unit.

activity—performance of a function.

adapted to—made suitable and/or fit for a specific use and/or situation.

alternating current (AC)—an electric current that reverses direction in a circuit at regular intervals.

alternator—a device adapted to convert mechanical energy to electrical energy. For the purposes of this application, the term "alternator" also includes generators.

apparatus—an appliance and/or device for a particular purpose.

approximately—nearly the same as.

automatic—performed via an information device in a manner essentially independent of influence and/or control by a user.

auxiliary device—non-power train devices associated with a vehicle, such as fans, blowers, windshield wipers, air conditioning, heaters, and/or pumps, etc.

auxiliary power system—a plurality of electrically coupled components adapted to deliver electrical power to auxiliary devices.

bus—an electrical conductor that makes a common connection between at least two circuits.

can—is capable of, in at least some embodiments.

comprising—including but not limited to.
constant—continually occurring; persistent; and/or unchanging.
continuously—uninterrupted in time, sequence, substance, and/or extent.
control—to exercise authoritative and/or dominating influence over; direct; adjust to a requirement; and/or regulate.
convert—to transform.
cool—to transfer thermal energy away.
cooling fluid—a fluid adapted to transfer heat energy.
correction—a change to a more desired value.
couple—to join, connect, and/or link two things together.
coupleable—adaptable to be connected.
crowd—to press, cram, and/or force together tightly.
DC chopper—a device adapted to modulate an unmodulated DC voltage.
define—to establish the outline, form, and/or structure of.
de-rate—lower the rated electrical capability of an electrical apparatus.
direct current (DC)—a non-alternating electric current.
double stator winding—a stationary part of a motor, dynamo, turbine or other working electrical machine with two separate windings on each pole. A rotor turns around the stator. Each of the two windings is adapted to receive power from a separate inverter.
drag—to cause to trail along a surface.
dragline—a large excavation machine used in surface mining to remove overburden (layers of rock and soil). A typical dragline casts a wire rope-hung bucket a considerable distance, collects the dug material by pulling the bucket toward itself on the ground with a second wire rope (or chain), elevates the bucket, and dumps the material on a spoil bank, in a hopper, and/or on a pile, etc.
drive—a means by which power is transmitted.
duty cycle—a fraction of time a system is actually employed in performing its function; a percentage of time a DC voltage is substantially non-zero.
electric—powered by electricity.
electrically coupled—objects connected or linked so as to allow a flow of electrons there between.
excitation—a degree of intensity of an electromagnetic field in an alternator caused by the application of a current to the alternator stator.
filter-less—an electrical system lacking a device adapted to reject signals of certain frequencies while allowing others to pass.
fluid—a liquid, slurry, vapor, mist, cloud, plume, and/or foam, etc.
fluid-to-air heat exchanger—a device adapted to transfer heat from a fluid to air.
frequency—a number of electrical voltage and/or current oscillations in a predetermined time period.
generating—producing electrical power.
harmonic current distortion—for an AC power signal, the ratio of a sum of the powers of all harmonic frequencies above and/or below a fundamental current frequency to the power of the fundamental current frequency.
harmonic filter—a device comprising a capacitor bank and an induction coil and that is designed and/or tuned to a predetermined non-linear load to eliminate and/or substantially attenuate a predetermined harmonic frequency range.
heat sink—a device adapted to transfer thermal energy away from a connected object.
hoist—to lift and/or raise.
Hz—an abbreviation for Hertz, which is a unit of frequency equal to one cycle per second.
input—related to electricity entering a device.
Insulated Gate Bipolar Transistor (IGBT)—a semiconductor device that has identical operation to a bipolar transistor, but has a field effect type gate, so that when a gate-emitter voltage is applied to make it conductive, no current needs to be injected. When gate-emitter voltage is very low the device switches off.
internal combustion engine—a device in which fuel is oxidized such that energy within the fuel is converted to mechanical energy, such as turning a shaft. The fuel can be gasoline, diesel fuel, ethanol, methanol, and/or any other hydrocarbon-based fluid, etc.
inverter—a device that converts DC power to AC power or AC power to DC power.
limit—a point beyond which something cannot or may not proceed.
load—an amount of mined earthen material associated with a bucket and/or truck, etc.
machine—a device and/or vehicle adapted to perform at least one task.
material—any substance that can be excavated and/or scooped.
may—is allowed to, in at least some embodiments.
mechanically coupled—at least a first object and a second object connected or linked so as to allow the first object to move physically in concert with the second object.
method—a process, procedure, and/or collection of related activities for accomplishing something.
mine—a site from which earthen materials can be extracted.
mining excavator—a machine for excavating material from the earth.
mining haul truck—a motor vehicle adapted to haul an extracted material.
modulated—varied with respect to frequency, amplitude, phase, or other characteristic.
off-road traction vehicle—a vehicle adapted for operation on earthen surfaces other than on paved surfaces. For example, off-road traction vehicles can comprise mining trucks, electric mining shovels, and/or electric mining excavators, etc.
operate—function.
output—something produced, and/or generated.
plurality—the state of being plural and/or more than one.
power—electrical energy usable to do work.
power factor—a ratio of true power to apparent power. A power factor of 1.0 indicates that current and voltage are in phase.
power factor compensating equipment—equipment adapted to change a phase relationship between an AC voltage and an AC current to a more desired value.
power sink—a device adapted to dissipate electrical energy by converting electrical energy usually to heat or mechanical energy.
predetermined—established in advance.
propel—to cause to move forward and/or backward.
provide—supply.
Pulse Wave Modulated (PWM)—a method of regulating the output voltage and frequency of a switching power supply by varying the width, but not the height, of a train of pulses; and/or the modulation of duty cycle of a signal and/or power source to convey information over a communications channel and/or control the amount of power sent to a load.

pump—a machine adapted to raise, compress, and/or transfer a fluid.

receive—to take, get, acquire, and/or have bestowed upon.

rectifier—a device that converts AC power to DC power.

retard—to attempt to slow; to resist motion.

set—a related plurality.

shovel—an electrically powered device adapted to dig, hold, and/or move ore.

signal—electrical power associated with, at any given time, a particular current value and a particular voltage value, and, across any particular range of time, the electrical power characterized by at least one alternating current, direct current, and/or voltage waves.

sin (sine)—the ordinate of the endpoint of an arc of a unit circle centered at the origin of a Cartesian coordinate system, the arc being of length x and measured counterclockwise from the point (1, 0) if x is positive or clockwise if x is negative.

sine wave—a wave with deviation that can be graphically expressed as the sine curve determinable by the equation $y=\sin(x)$.

sine wave output current—an electrical current oscillating about a central point wherein a graphical representation of the oscillation resembles a sine wave.

sinusoidal filter—an electrically coupled reactor and capacitor adapted to create sine waves of the output current of a frequency drive.

space vector modulated (SVM)—a form of pulse width modulation for regulating the output voltage and frequency of a signal characterized by varying the width, but not the height, of a train of pulses; and/or the time intervals between pulses. Space vector modulated signals are distinguished from other forms of pulse width modulated signals by the method of determining when the pulses begin and end. Space vector modulated pulses are timed via a calculated space vector.

speed—a velocity.

static—stationary and/or constant.

substantially—to a great extent and/or degree.

swing—to move laterally and/or in a curve.

switched capacitor bank—a plurality of capacitors adapted to be automatically switched into an electrical power transmission circuit, usually to correct a power factor.

system—a collection of mechanisms, devices, data, and/or instructions, the collection designed to perform one or more specific functions.

temperature—measure of the average kinetic energy of the particles in a sample of matter, expressed in terms of units or degrees designated on a standard scale.

temperature sensor—a device adapted to provide a signal proportional to a temperature.

traction motor—an electric motor mechanically coupled to provide motive force to move a machine.

unmodulated—substantially constant. For example, a relatively constant DC voltage is unmodulated.

variable—likely to change and/or vary, subject to variation, and/or changeable.

voltage—(a.k.a., "potential difference" and "electromotive force" (EMF)) a quantity, expressed as a signed number of Volts (V), and measured as a signed difference between two points in an electrical circuit which, when divided by the resistance in Ohms between those points, gives the current flowing between those points in Amperes, according to Ohm's Law.

wave—a disturbance, variation, and/or incident that causes the transfer electrical energy progressively from point to point in a medium.

waveform—a profile, graph, and/or visual model of variations of voltage and/or current over time.

DETAILED DESCRIPTION

FIG. 1 is a block diagram of an exemplary embodiment of an energy management system 1000. In certain exemplary embodiments, energy management system 1000 can be a part of a machine such as an off-road traction vehicle. The machine can be a vehicle, such as an automobile, pick-up truck, tandem wheel truck, bus, mining excavator, locomotive, and/or mine haul truck, etc. The machine can be a transport, an elevator, an industrial machine, etc. Energy management system 1000 can comprise an alternator 1100. Alternator 1100 can be mechanically coupled to an internal combustion engine. Alternator 1100 can generate AC signals thereby converting mechanical energy from the internal combustion engine to electrical energy.

Energy management system 1000 can comprise a rectifier 1150. Rectifier 1150 can comprise an active Insulated Gate Bipolar Transistor (IGBT). Rectifier 1150 can be adapted to convert AC signals to DC signals. Rectifier 1150 can provide DC signals to a DC bus 1175. The signals provided to the DC bus from the DC rectifier can have a voltage of approximately 120, 135.67, 159.1, 224.5, 455, 460.75, 885, 930.1, 1200, 1455.45, 1687.1, 2000, 2200.32, 2300.12, 3000.6, 5500 Volts, and/or any other value or range of voltages therebetween. The voltage on DC bus 1175 can be varied by changing an internal combustion engine speed, the on and off duty cycle of rectifier 1150, and/or the excitation of alternator 1100.

Energy management system 1000 can comprise a plurality of inverters 1500, 1600, 1700, 1800, which can be adapted to drive a plurality of traction motors 1900, 1950. Inverters 1500, 1600, 1700, 1800 can be active IGBT inverters. Inverters 1500, 1600, 1700, 1800 can be adapted to provide AC signals at a frequency of approximately 29.9, Hz, 40 Hz, 48.75 Hz, 54.2 Hz, 60 Hz, 69.2 Hz, 77.32 Hz, 85.9 Hz, 99.65 Hz, 120 Hz, 144.2 Hz, 165.54 Hz, 190.3, 240 Hz and/or any value or sub-range of values therebetween.

Each of traction motors 1900, 1950 can comprise double stator windings. Motors comprising double stator windings can be adapted to operate and/or generate signals at a higher frequency. But even if frequency is not increased, by utilizing AC motors having double stator windings, up to approximately double the torque can be achieved at the same motor line current value. Additional information on Double stator motor technology can be found in U.S. Pat. No. 4,785,213 (Satake), which is incorporated by reference in its entirety.

Energy management system 1000 can comprise a circuit adapted to dissipate energy generated via traction motors 1900, 1950 when the machine is operating under retard. The circuit can comprise a chopper circuit, which can be an active IGBT chopper circuit comprising one or more active IGBT transistors 1300, 1350. Energy passing through an IGBT 1300, 1350 can be dissipated via resistor 1400. Resistor 1400 can be a resistor, a grid resistor (or resistor array), or a plurality of grid resistors.

Figure 4:
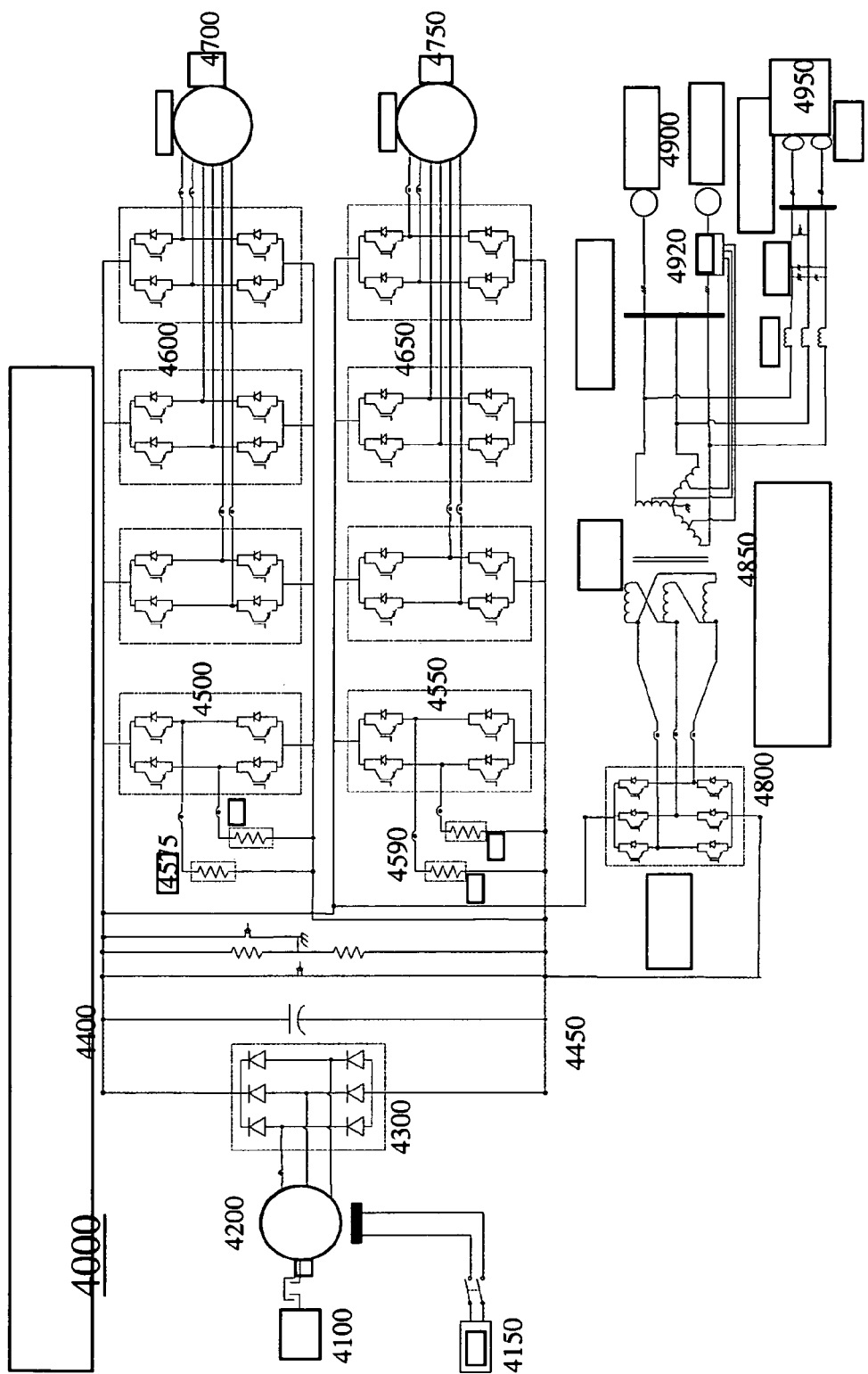
FIG. 4 is a block diagram of an exemplary embodiment of an energy management system 4000.

Each of inverters 1500, 1600, 1700, 1800 can be illustrated as individual transistor devices for simplicity. Each of inverters 1500, 1600, 1700, 1800 can comprise a plurality of transistors for each power phase provided to traction motors 1900, 1950 such as illustrated in FIG. 4. An inverter circuit supplying a phase for a stator winding can comprise two switching devices for providing Pulse Width Modulated (PWM) or Space Vector Modulated (SVM) signals to traction motors 1900, 1950.

Various algorithms can be used by information device 1200 to control switching in energy management system 1000. In order to understand the operation of the circuitry in energy management system 1000, a simpler circuit can be analyzed. For example, each set of three phases of signals supplied to traction motors 1900, 1950 can comprise six switching devices (as illustrated for a single three phase power supply in FIG. 6). Each of inverters 1500, 1600, 1700, 1800 can be controlled via an information device 1200.

Figure 6:
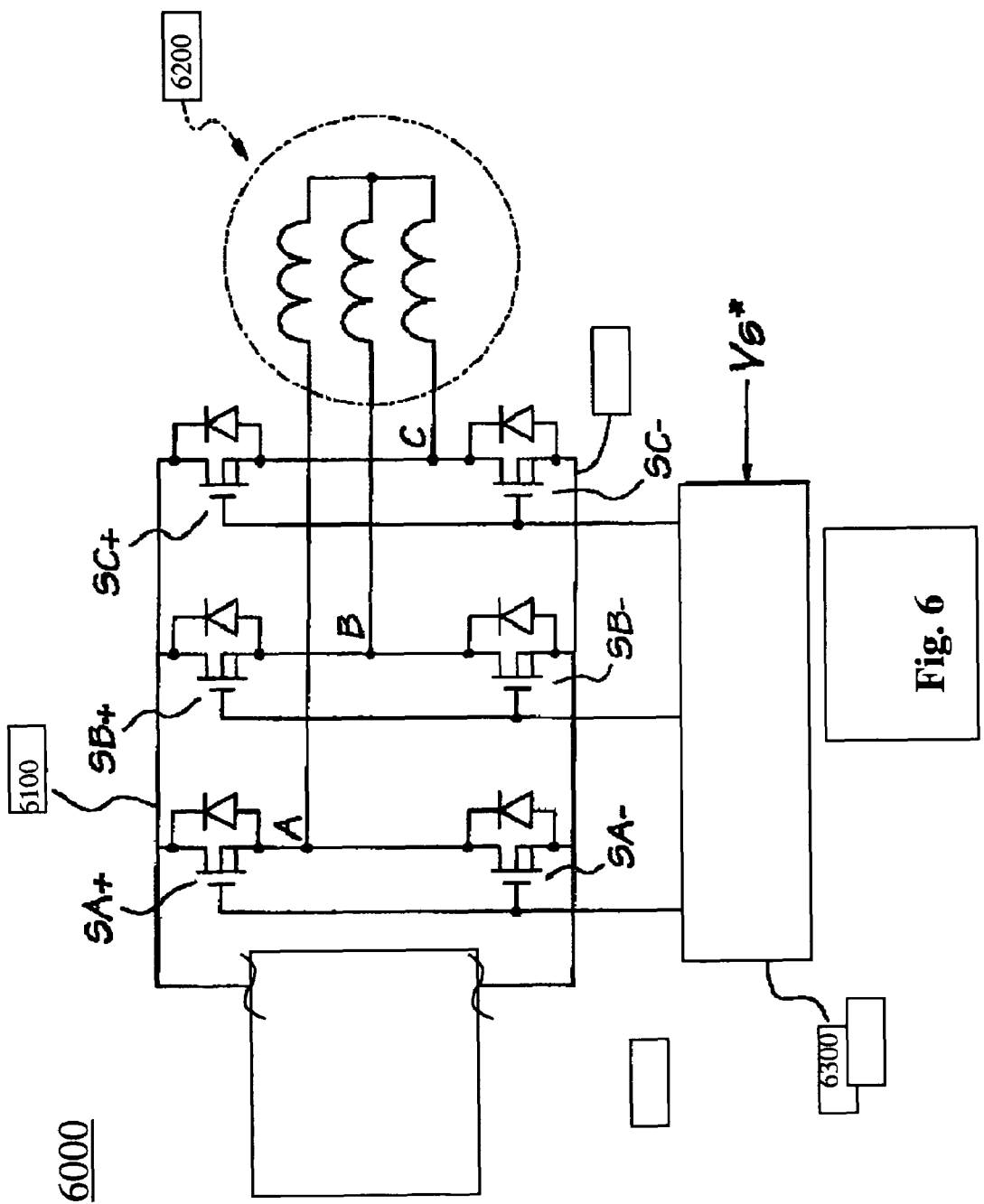
FIG. 6 is a block diagram of an exemplary embodiment of an inverter circuit 6000.

FIG. 6 is a block diagram of an exemplary embodiment of an inverter circuit 6000.

For a three phase system, a first phase can be denoted phase "A," a second phase can be denoted phase "B," and a third phase can be denoted phase "C." Using similar nomenclature, the associated switching devices can be denoted as SA+, SA−, SB+, SB−, SC+ and SC−. Each set of six switching devices can be connected into a bridge circuit between connection points to DC bus 6100. The switching devices can be operated by PWM switching or SVM switching controlled by information device 6300. Information device 6300 can be adapted to provide switching signals responsive to a calculated command vector.

Since one of the two switches for each phase of power can be turned on, the switching states of each phase provided to traction motor 6200 can be represented by three binary numbers (SA, SB, SC). For this representation, a "1" can indicate that the upper or +switching device is on and a "0" can indicate that the lower or −switching device can be on. Thus, (0, 0, 0) indicates that SA−, SB− and SC− are on and SA+, SB+ and SC+ are off; (1, 0, 0) indicates that SA+, SB− and SC− are on and SA−, SB+ and SC+ are off; etc.

Figure 7:
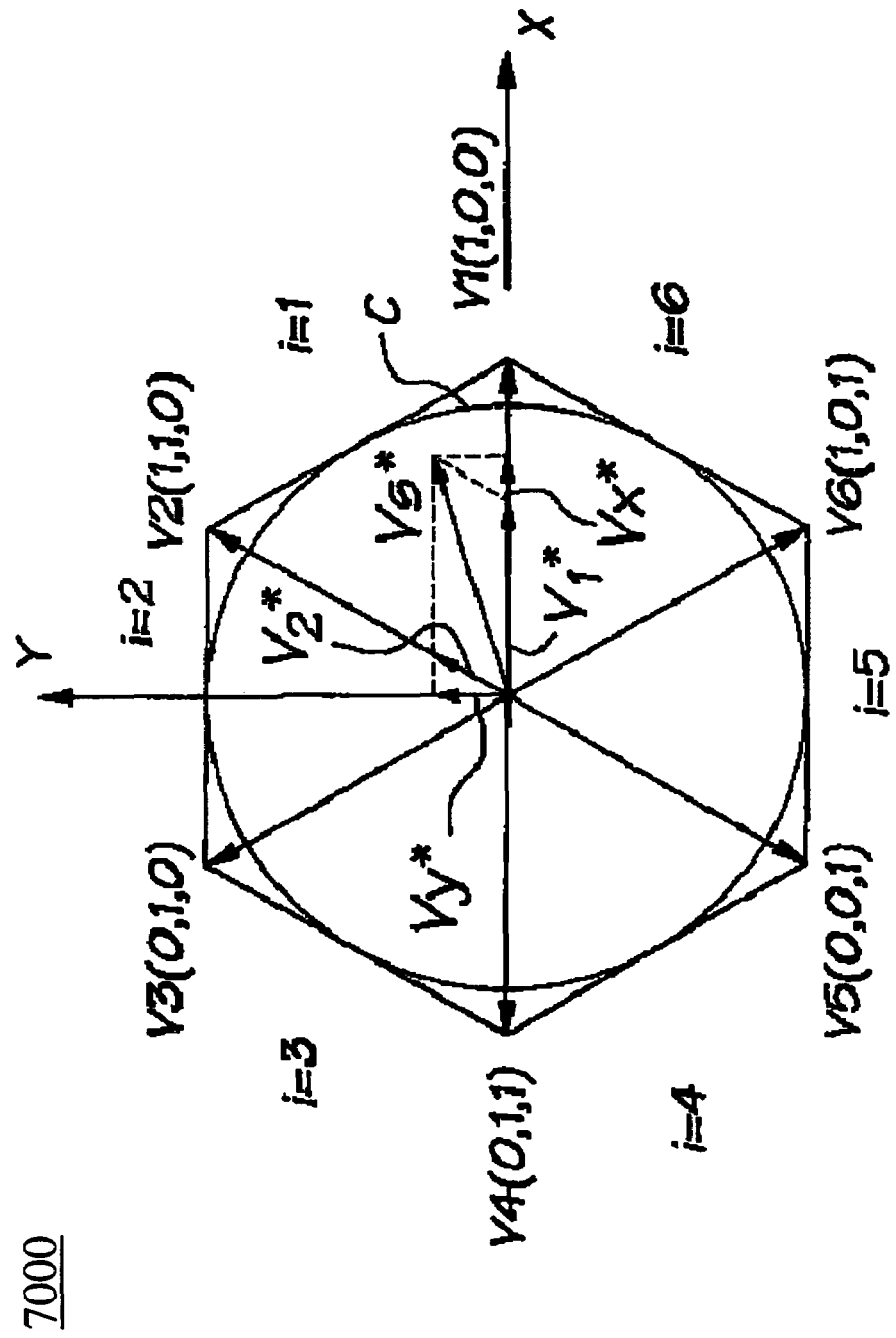
FIG. 7 is a diagram of an exemplary set of vectors 7000 associated with an inverter circuit.

Each of the eight resulting coordinate sets can be modeled as switching or voltage vectors V0 through V7 as shown in FIG. 7 with (0, 0, 0) or V0 and (1, 1, 1) or V7 being zero vectors. The hexagon spanned by the six non-zero voltage vectors V1 through V6 can be divided into six 60° regions, 1 through 6, and each region can be spanned by two non-zero voltage vectors. The magnitude or length of each non-zero voltage vector can be equal to 2V/3 where V can be the magnitude of the voltage on the DC bus.

Vectors can be represented by their projections onto X and Y axes superimposed onto the hexagon spanned by the vectors V1 through V6. For example, the voltage command vector $V_s^*$ can be projected to define $V_x^*$ and $V_y^*$ as shown in FIG. 7. The projections of each non-zero vector onto the X and Y axes can be determined from the equations:

$$V_{i,x} = 2 \cdot V/3 \cdot [\cos((i-1)60°)] \quad (1)$$

$$V_{i,y} = 2 \cdot V/3 \cdot [\sin((i-1)60°)] \quad (2)$$

where i can be the index of the vectors (i.e., i=1 represents voltage vector V1, i=2 represents voltage vector V2, and so forth); i can also be interpreted as the index for the regions 1 through 6.

A number of known PWM or SVM control arrangements can be used to control the switching devices SA+, SA−, SB+, SB−, SC+ and SC− to generate a three phase balanced set of AC voltages from the fixed DC voltage V. For SVM, a voltage command vector rotating in the X-Y plane can represent a balanced three phase voltage command. For each pulse width modulation control period, a three phase voltage command can be represented by a voltage command vector in the X-Y plane spanned by the six non-zero voltage vectors V1 through V6 available, for example, from the inverter circuit 6000 of FIG. 6. Each voltage command vector can be approximated or constructed by combining properly proportioned vectors which can be aligned with the two adjacent non-zero vectors and an appropriate one of the zero vectors, V0 or V7.

For example, as shown in FIG. 7 for the first sector, the voltage command vector $V_s^*$ can be approximated by $V_1^*$, $V_2^*$ and one of the zero vectors, V0 or V7. Zero vectors can be chosen so that only one of the switching devices SA+, SA−, SB+, SB−, SC+ and SC− needs to change its on/off state for each transition from one non-zero vector to the zero vector to the next non-zero vector. The size or time span for each of the voltage vectors can be selected to balance the volt-seconds commanded by the command vector and the actual volt-seconds applied, for example, by the inverter circuit 6000 of FIG. 6.

In certain exemplary embodiments of SVM a sampling interval, $T_S$, much smaller than $\frac{1}{6}$ cycle of the intended output fundamental, can be assigned. Once the vector components are determined, within each sampling interval the vector components can be considered as a time weight ratio. The switches can operate to apply each of two active vectors for a specific fraction of $T_S$. Then zero state intervals can be added to make the total time come out to $T_S$. This can be considered a PWM process, in the senses that the average behavior over many $T_S$ intervals tracks the desired output vector, and that the time weights can be interpreted as duty ratios. In practice, the vector components can be re-computed at each time $kT_S$, where k can be an integer. Thus these times can serve as uniform sampling intervals, and the average behavior over each interval can be determined by the voltage vector at time $kT_S$.

Figure 8:
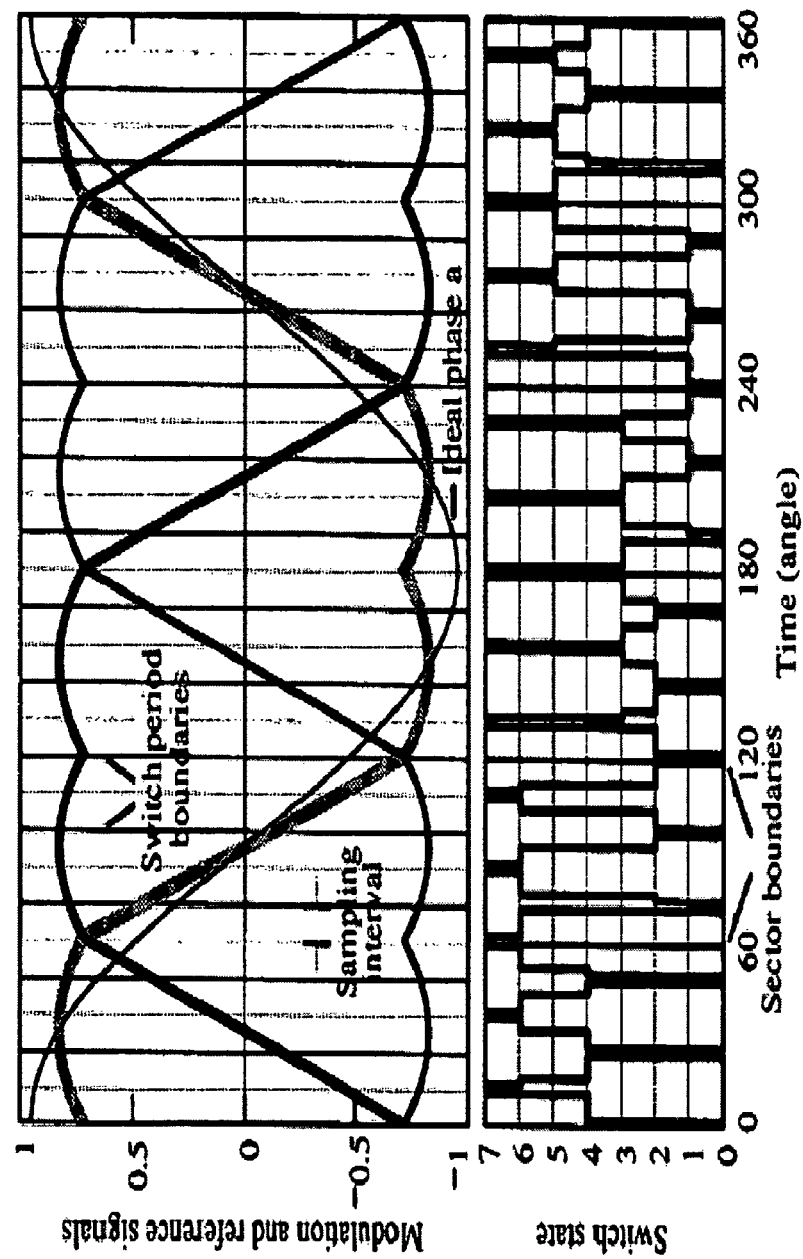
FIG. 8 is an exemplary phase voltage waveform generated via Space Vector Modulation.

FIG. 8 illustrates an example of an SVM process in time domain, given a switching frequency that can be 15 times the intended fundamental output frequency (the modulation frequency) and 95% modulation relative to a sine. The switching sequence can be as shown at the bottom of FIG. 8. The equivalent distorted modulation, with the reference sinusoid for phase a, can be as shown at the top of FIG. 8. In Sector I, the switch sequence can be 0-4-6-7-6-4-0 such that only one switch changes state at a time. The sequences for the other sectors can be obtained from FIG. 3. In a given sector, the vector-domain form of the desired output voltage can be expressed as:

$$\vec{v}_{out} = \frac{T_i}{T_s} \hat{v}_i + \frac{T_j}{T_s} \hat{v}_j \quad (3)$$

in which vector components $T_i/T_s$ and $T_j/T_s$ can become time weights associated with switch states associated with each respective region. The total time $T_s = T_i + T_j + T_0 + T_7$ can be the sampling interval. Zero state durations $T_0$ and $T_7$ can be arbitrary, provided their sum gives the correct $T_S$, which shows that there can be a degree of freedom. In SVM, each zero state can be applied for an identical interval, to give $T_0 = T_7$.

A scaling factor can be introduced in the space-vector definitions. The vector scale in space-vector domain can be 3 m/4, where m can be the modulating depth for each phase voltage (with associated with full sinusoidal modulation). The factor of ¾ can be derived first by noting that m is determined by $$m = \frac{V_{ph}}{\frac{V}{2}} \quad (4)$$

where $V_{ph}$ is the peak output phase voltage. The (balanced) time-domain phase voltages can be transformed to coordinates using an un-normalized Park transformation, via a factor of 3/2. As a result, the scaling from phase voltages to the desired output vector can become:

$$\vec{V}_{out} = \begin{pmatrix} 1 & -\frac{1}{2} & -\frac{1}{2} \\ 0 & -\frac{\sqrt{3}}{2} & \frac{\sqrt{3}}{2} \\ \frac{1}{2} & \frac{1}{2} & \frac{1}{2} \end{pmatrix} \begin{pmatrix} V_{ph}\cos(\omega t) \\ V_{ph}\cos\left(\omega t - \frac{2\pi}{3}\right) \\ V_{ph}\cos\left(\omega t + \frac{2\pi}{3}\right) \end{pmatrix} \quad (5)$$

$$= \frac{3}{4}mV\begin{pmatrix} \cos(\omega t) \\ \sin(\omega t) \end{pmatrix}$$

To relate this to a time domain, the normalized voltage components can be associated with time functions $M_d(t)=m\cos(\omega t)$ and $M_q(t)=m\cos(\omega t)$, respectively.

Thus, the normalized output voltage vector can be written as $\vec{v}_{out}=(3/4)M_d(t)\hat{v}_q$. In SVM a basis with the axes in FIG. 7 can be transformed into a basis in an i-j coordinate system with (with basis vectors $B_{ij}$) to find $T_i$ and $T_j$ and in (3). In Sector I, the basis vectors are $\hat{v}_4$ and $\hat{v}_6$, related to the x-y coordinate system by $$\begin{pmatrix} \hat{v}_4 \\ \hat{v}_6 \end{pmatrix} = P\begin{pmatrix} \hat{v}_x \\ \hat{v}_y \end{pmatrix} \quad (6)$$

where is P can be a 2×2 transformation matrix that can be sector dependent.

The transformation matrices can be as shown in Table I for all sectors.

TABLE I

| Sector I | Sector II | Sector III |
|---|---|---|
| $B_{ij} = \{\hat{v}_4\ \hat{v}_6\}$ | $B_{ij} = \{\hat{v}_6\ \hat{v}_2\}$ | $B_{ij} = \{\hat{v}_2\ \hat{v}_3\}$ |
| $P = \begin{pmatrix} 1 & 0 \\ \frac{1}{2} & \frac{\sqrt{3}}{2} \end{pmatrix}$ | $P = \begin{pmatrix} \frac{1}{2} & \frac{\sqrt{3}}{2} \\ -\frac{1}{2} & \frac{\sqrt{3}}{2} \end{pmatrix}$ | $P = \begin{pmatrix} -\frac{1}{2} & \frac{\sqrt{3}}{2} \\ -1 & 0 \end{pmatrix}$ |
| Sector IV | Sector V | Sector VI |
| $B_{ij} = \{\hat{v}_3\ \hat{v}_1\}$ | $B_{ij} = \{\hat{v}_1\ \hat{v}_5\}$ | $B_{ij} = \{\hat{v}_5\ \hat{v}_4\}$ |
| $P = \begin{pmatrix} -1 & 0 \\ -\frac{1}{2} & -\frac{\sqrt{3}}{2} \end{pmatrix}$ | $P = \begin{pmatrix} -\frac{1}{2} & -\frac{\sqrt{3}}{2} \\ \frac{1}{2} & -\frac{\sqrt{3}}{2} \end{pmatrix}$ | $P = \begin{pmatrix} \frac{1}{2} & -\frac{\sqrt{3}}{2} \\ 1 & 0 \end{pmatrix}$ |

Sector I can be used as the basis for a discussion applying to each respective sector. The matrix P can relate to basis vectors. For this linear transformation, the components can be related such that the i-j vector components in column form are $(P^{-1})^T$ times the x-y components. Thus components $T_4/T_s$ and $T_6/T_s$ can be computed as:

$$\begin{pmatrix} \frac{T_4}{T_s} \\ \frac{T_6}{T_s} \end{pmatrix} = (P^{-1})^T \begin{pmatrix} \frac{3}{4}M_d(t) \\ \frac{3}{4}M_q(t) \end{pmatrix} = \begin{pmatrix} 1 & -\frac{1}{\sqrt{3}} \\ 0 & \frac{2}{\sqrt{3}} \end{pmatrix} \begin{pmatrix} \frac{3}{4}M_d(t) \\ \frac{3}{4}M_q(t) \end{pmatrix}. \quad (7)$$

The time argument in (7) can utilize sampling to support duration computations. At the sampling times, (7) can be expressed as:

$$\frac{T_4}{T_s} = \frac{3}{4}M_d(kT_s) - \frac{\sqrt{3}}{4}M_q(kT_s) \quad (8)$$

$$\frac{T_0}{T_s} = \frac{\sqrt{3}}{2}M_q(kT_s).$$

Typically, a separate information device tracks the switch sequence that can minimize a number of transitions.

Additional information on Space Vector Modulation can be found in U.S. Pat. No. 5,552,977, U.S. Pat. No. 6,023,417, U.S. Pat. No. 6,316,895, U.S. Pat. No. 6,819,078, and U.S. Pat. No. 6,839,249 which are incorporated by reference in their entirety, and from Alexis Kwasinski, Philip T. Krein, and Patrick L. Chapman, Time Domain Comparison of Pulse-Width Modulation Schemes, IEEE Power Electronics Letters, Vol. 1, No. 3 (September 2003).

Certain exemplary embodiments use a direct-reverse SVM technique to control IGBTs in inverters 1500, 1600, 1700, 1800, which can reduce switching losses in the IGBTs and/or provide extended utilization of the voltage of DC bus 1175 when compared to other PWM methods.

Figure 2:
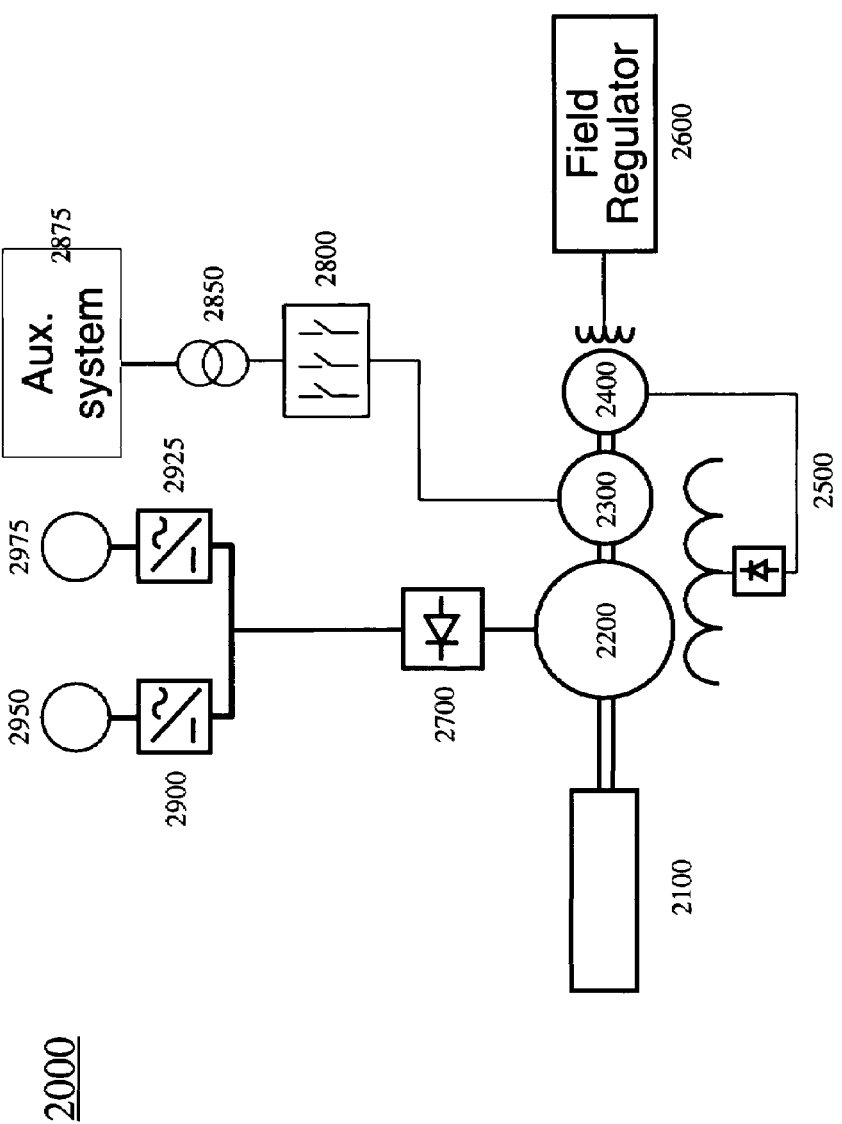
FIG. 2 is a block diagram of an exemplary embodiment of an energy management system 2000.

FIG. 2 is a block diagram of an exemplary embodiment of an energy management system 2000. In certain exemplary embodiments, energy management system 2000 can comprise an internal combustion engine 2100. Internal combustion engine 2100 can be mechanically coupled to a first alternator 2200 and a second alternator 2300. First alternator 2200 and second alternator 2300 can be controlled by a regulating circuit. The regulating circuit can comprise a field regulator 2600, a third alternator 2400 and a rectifier and coil set 2500. The regulating circuit can be adapted to change an excitation current to first alternator 2200 and second alternator 2300 thereby changing a voltage produced by first alternator 2200 and second alternator 2300.

First alternator 2200 can be adapted to provide signals to a rectifier 2700. Rectifier 2700 can be an active IGBT rectifier, which can receive AC signals from the first alternator 2200 and provide DC signals to a DC bus. The DC bus can be adapted to provide signals to a first inverter 2900 and a second inverter 2925. First inverter 2900 and second inverter 2925 can be active IGBT inverters, which can operate under normal conditions receiving DC signals from the DC bus and provide AC signals to first traction motor 2950 and second traction motor 2975.

When the machine associated with energy management system 2000 is under retard, traction motor 2950 and traction motor 2975 can generate electrical signals. When traction motor 2950 and traction motor 2975 act as electric generators, such as when the machine is under retard, first inverter 2900 and second inverter 2925 can be adapted to receive AC signals from traction motor 2950 and traction motor 2975 and provide DC signals to the DC bus.

Second alternator 2300 can be adapted to provide signals to an auxiliary system 2875. Second alternator 2300 can be electrically coupled to a switch set 2800. Switch set 2800 can be adapted transfer the power supply to auxiliary system 2875 from second alternator 2300 and a circuit adapted to provide power to auxiliary system 2875 while the machine is under retard.

Switch set 2800 can be electrically coupled to an auxiliary transformer 2850. Auxiliary system 2850 can be adapted to change a voltage of signals supplied to auxiliary system 2875. For example, auxiliary transformer 2850 can reduce a voltage output by second alternator 2300 to a lower voltage for auxiliary system 2875.

Figure 3:
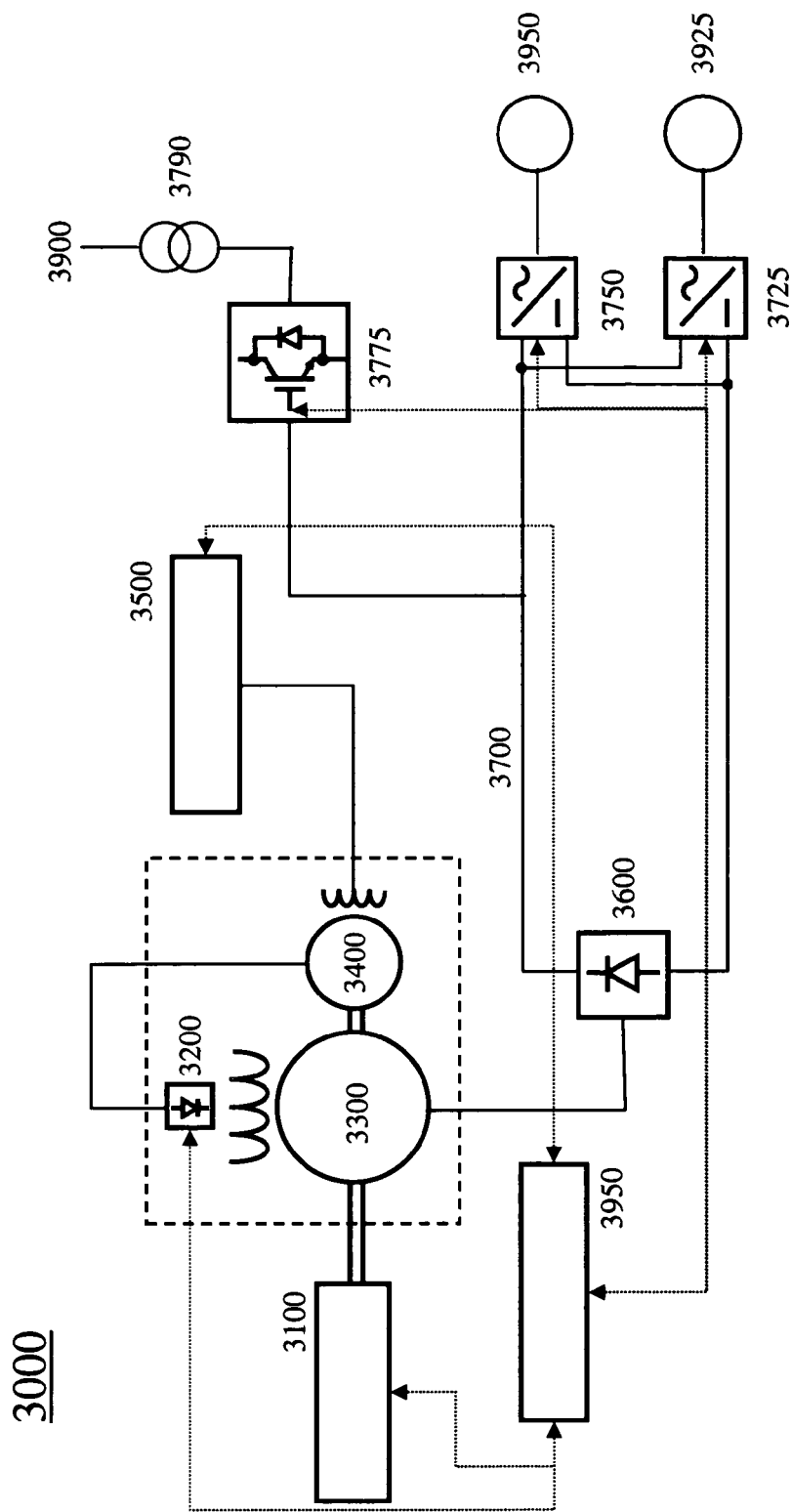
FIG. 3 is a block diagram of an exemplary embodiment of an energy management system 3000.

FIG. 3 is a block diagram of an exemplary embodiment of an energy management system 3000. Energy management system 3000 can comprise an internal combustion engine 3100. Energy management system 3000 can comprise a first alternator 3300 and a second alternator 3400. Energy management system 3000 can comprise a field regulating circuit adapted to change an output voltage of first alternator 3300. The field regulating circuit can comprise second alternator 3400 magnetically coupled to a field regulator 3500. Second alternator 3400 can be electrically coupled to a rectifier and coil set 3200. Field regulator 3500 can be adapted to change a voltage and/or current output from second alternator 3400. Rectifier and coil set 3200 can be adapted to transfer electrical current from second alternator 3400 to provide a time-variable excitation to first alternator 3300. First alternator 3300 can be adapted to produce 3-phase AC signals.

First alternator 3300 can be electrically coupled to a rectifier 3600, which can be electrically coupled to a DC bus 3700. Rectifier 3600 can be an active IGBT rectifier, which can comprise an input reactor, a plurality of IGBT transistors and anti parallel diodes in a 6-pulse bridge configuration, low inductance bus connections, a firing circuit to turn on/off the IGBTs, current and voltage transducers, and/or a digital control circuit, etc.

Rectifier 3600 can be adapted to provide DC signals to DC bus 3700. Rectifier 3600 can draw sinusoidal current irrespective of load and/or supply conditions. In certain machines, rectifier 3600 can be a three phase full wave uncontrolled unit (i.e. diodes). In certain exemplary embodiments, rectifier 3600 can be filter-less. Rectifier 3600 can be adapted to limit harmonic current distortion to a value of approximately 5 percent, 4.02 percent, 2.998 percent, 2 percent, 1.1 percent, and/or 0.5 percent, etc. or any value or subrange therebetween. Rectifier 3600 can be adapted to provide an active input power factor correction to approximately 0.95, 0.96, 0.97, 0.98, 0.99, and/or 1.00, etc. or any value or subrange therebetween. In certain exemplary embodiments rectifier 3600 can be adapted for use on mining shovels and/or draglines.

DC bus 3700 can be electrically coupled to inverters 3725, 3750. Inverters 3725, 3750 can be active IGBT inverters. Inverters 3725, 3750 can generate a space vector modulated (SVM) AC signal. Inverters 3725, 3750 can be adapted to provide a sinusoidal output current irrespective of load and/or supply conditions, with less than approximately 7 percent, 6.01 percent, 5 percent, 3.997 percent, 3 percent, 2.1 percent, and/or 1 percent total harmonic distortion or any value or subrange therebetween.

Inverters 3725, 3750 can be adapted to generate a Space Vector Modulated sinusoidal AC voltage having a duty cycle that can be continuously varied to affect the time-averaged voltage output to, for example, traction motors 3925 and 3950. The output voltage of inverters 3725 and 3750 can be varied in frequency, phase shift, and/or magnitude or a root mean square value thereof, etc. Inverters 3725, 3750 can be adapted to receive DC signals from DC bus 3700 and to deliver AC signals, such as 3-phase AC signals, to traction motors 3925, 3950 when the machine associated with energy management system 3000 is under propulsion. Traction motors 3925, 3950 can be mechanically coupled to axles and wheels adapted to propel the machine. When the machine is under retard, traction motors 3925, 3950 can be adapted to generate AC signals. When traction motors 3925, 3950 generate AC signals, inverters 3725, 3750 can be adapted to provide DC signals to DC bus 3700.

Energy management system 3000 can comprise an auxiliary system inverter 3775. Auxiliary system inverter 3775 can be adapted to output variable 3-phase AC signals. Inverter 3775 can generate an AC waveform having a frequency of approximately 60, 90, 120, and/or greater cycles/second (hertz) and a magnitude of from approximately 100 to approximately 1800 volts, including all values and subranges therebetween, such as approximately 460, 600, and 720 volts, etc. Auxiliary system inverter 3775 can be an active IGBT inverter. Auxiliary system inverter 3775 can be adapted to generate a sine wave Pulse Wave Modulated DC voltage.

Inverter 3775 can be controlled utilizing an AC voltage sensor that can be connected at the filtered output of three-phase transformer 3790 for the regulation of the output AC voltage by controlling a modulation index of inverter 3775. The set modulation index can be calculated or looked up from a table based upon the main DC link voltage value. In certain exemplary embodiments, after a modulation index is ramped up, the three-phase bus voltage can be tuned using the AC voltage sensor to a desired root mean squared value. The AC voltage sensor can be continuously used to regulate the voltage value within +/−5% tolerance as a load is changing on the AC side. A load on a filtered section side of inverter 3775 can be constant and 100% duty, which can reduce a chance of having over voltage at light loads due to a sinusoidal filter. The sinusoidal filter can be electrically coupled to auxiliary system inverter 3775.

Auxiliary system inverter 3775 can be adapted to provide power to an auxiliary system 3900 comprising auxiliary devices associated with the machine. Auxiliary system inverter 3775 can be adapted to receive DC signals from DC bus 3700 and provide AC signals to auxiliary system 3900. Auxiliary inverter 3775 can be electrically coupled to a transformer 3790 and/or sinusoidal filters. Transformer 3790 can be adapted to receive AC signals from auxiliary system inverter 3775 at a first voltage and provide AC signals of a second voltage to auxiliary system 3900. Auxiliary system inverter 3775 can generate a Sinewave Pulse Wave Modulated (SPWM) DC voltage having a duty cycle ("on time") that can be continuously varied to affect the time-averaged voltage output to, for example, the motors. Auxiliary system inverter 3775 and/or inverters 3725 and 3750 can use a Space Vector Pulse Wave Modulation (SVPWM) technique instead of SPWM.

Auxiliary inverter 3775 can utilize SPWM or SVM methods based on the load requirements and/or details of the implementation.

Auxiliary system inverter 3775 can comprise a medium power rating such as 400 KVA, which can be used as an auxiliary power supply for auxiliary system 3900. For example, auxiliary system inverter 3775 can be a Siemens ST 1500 WL module or a Siemens ST1500 FL module (wherein the 1500 WL module is water cooled and the ST1500 FL module is forced air cooled). Auxiliary system inverter 3775 can run as a PWM voltage source inverter fed from DC bus 3700. Transformer 3790 can be a three-phase transformer and/or can provide isolation and/or can step down the voltage supplied to auxiliary system 3900. Transformer 3790 can lack a higher leakage impedance for filtering purposes. The unfiltered output of the transformer can feed AC motors running a main blower and/or a braking resistor blower. A blower motor can be started using contactors and/or a 50% tap winding starter on the secondary of the transformer. Three phase series filters, air core reactors, and/or a three-phase delta connected capacitor bank can feed a water pump and/or a blower for an inside room cooler.

Auxiliary system 3900 can comprise an unfiltered three-phase AC bus that can feed, for example, a blower adapted to cool a traction motor, alternator, heat exchanger, and/or a braking unit, etc. The AC motor running this blower can be connected via a secondary winding tap starter. A filtered three phase bus in auxiliary system 3900 can feed a water pump driven by an AC motor and/or a blower for an inside room cooler driven by an AC motor. To minimize the size and/or weight of the magnetic components in auxiliary system 3900, the base frequency can be selected as approximately 120 Hz. AC motors in auxiliary system 3900 can run off of a 440V/120 Hz supply. As a general approximation; for mine elevations under 10,000 feet, motors can be run at 367V/100 Hz, and for higher elevations, motors can run at full 440V/120 Hz In embodiments operating at 120 Hertz (compared to 60 Hz) for a rated output voltage and maintaining an approximately constant voltage/frequency (V/f) slope for other operating points, the size of transformer 3790 can be decreased approximately in half, thereby reducing the size, footprint, and/or weight of the transformer with a similar ratio. Based on the rated vehicle pay load, this weight savings can translate to higher truck utilization through added pay load capability and/or higher volume per truck per day which can vary depending on a haul cycle.

In certain exemplary embodiments, the speed of internal combustion engine 3100 can be lowered as compared to conventional machines that can be required at idle at a higher speed to appropriately power the truck's auxiliary system. Auxiliary system 3900 can receive an AC signal from a three-phase auxiliary supply that can be fed from DC bus 3700. In certain exemplary embodiments, DC bus 3700 can be charged by a DC signal generated via traction motors 3925, 3950, which act as generators during electrical braking and hence provide electrical energy. The energy provided thereby to auxiliary system inverter 3775 can enable auxiliary system to be independent from internal combustion engine 3100, thereby allowing internal combustion engine 3100 to go into true idle (which can be based on the specification of the diesel engine manufacturer, and can be below approximately 1000, 900.05, 799.9, and/or 750.3 rpm, etc.). Using energy generated via traction motors 3925, 3950 can reduce machine fuel consumption and/or increase equipment life. In normal driving conditions (e.g., propel mode), power for auxiliary system 3900 can come from internal combustion engine 3100.

Certain exemplary embodiments can act as a "true brake," that is, they can allow internal combustion engine 3100 to shut down while the machine is braking. A true brake can safely stop a moving machine even in the case of a loss of power from internal combustion engine 3100. In this case, since power can be generated by traction motors 3925, 3950, the electric brake (comprised in DC choppers and/or braking resistor unit) can operate independently of internal combustion engine 3100, i.e., no energy need be fed through alternator 3400 from internal combustion engine 3300 since energy can come from traction motors 3925, 3950.

Auxiliary system 3900 can be designed for a higher frequency than the standard 50 or 60 Hz. In certain exemplary embodiments, the auxiliary system can be designed to operate at frequencies from approximately 100 to approximately 120 Hz, rated voltages up to approximately 460V, thus, still allowing use of standard NEMA motors that can be rated at approximately 60 Hz and/or 460V as long as sufficient torque is available for the loads. Also, higher frequencies can allow the size of transformer 3790 to be reduced significantly along with its weight, cost, and/or foot print. This can save weight on the machine and/or allow for better utilization and/or more efficient haul cycles.

In certain exemplary embodiments, motor loads in auxiliary system 3900 can be continuous duty with the exception of an AC motor running the braking resistor blower, which can be connected on-line through an AC motor starter and ramped up to full speed. The power rating of this blower can be approximately 50% of the overall power loading of auxiliary system 3900.

The main DC link voltage feeding the auxiliary system inverter 3775 can be variable between approximately 1200V and 2000V. The chassis of the machine can be grounded through a floating ground with a resistor ratio of approximately 1:3 (e.g., the frame can be approximately 667 volts below main DC link positive and approximately 1334V above main DC link negative). The AC motors used on the secondary side can be conventional NEMA B AC motors adapted to operate at approximately 440V/60 Hz.

When a machine is started up, the output of auxiliary system inverter 3775 can be ramped up to a voltage value that corresponds to an operating frequency based on the V/f curve. The operating frequency can based on a terrain profile and/or elevation (e.g., approximately 90 Hz<f<approximately 120 Hz). The voltage ramp from zero need not cause any inrush currents while starting connected AC motors in auxiliary system 3900 (e.g., pump, traction motor cooler blower, and/or alternator cooler blower). In addition, the start up can be within reasonable time (e.g., approximately 15 to approximately 20 seconds).

An AC voltage sensor can be connected at a filtered output of transformer 3790 for the regulation of an output AC voltage by controlling a modulation index of auxiliary system inverter 3775. The modulation index can be calculated (or looked up in a table) from the voltage value of DC bus 3700. After the modulation index is ramped up, the three phase bus voltage can be tuned using the AC voltage sensor to a required root mean square value. The AC voltage sensor can be continuously used to regulate the voltage value within +/−approximately 5% tolerance as the load is changing on the AC side. The load on the filtered section side can be constant and approximately 100% duty, which can reduce the chance of having over-voltage at light loads due to a sinusoidal filter.

Certain exemplary embodiments can, as a result of using a base frequency of approximately 120 Hz in auxiliary system 3900, reduce the footprint of auxiliary system 3900; reduce the weight of magnetic components employed in auxiliary system 3900; improve a machine (since "dead" loads hauled by the machine can be reduced); improve utilization of braking energy of traction motors 3925, 3950; reduce the energy that can be wasted as heat in resistive elements dissipating braking energy from traction motors 3925, 3950; reduce maintenance; reduce running costs; increase life for internal combustion engine 3100; and/or reduce a cost of an AC motor starter that can utilize a 50% tap on a secondary winding of transformer 3790 for starting motors that can operate with a partial duty cycle in auxiliary system 3900, etc.

Certain exemplary embodiments of auxiliary system 3900 can have the characteristics listed in Table II.

TABLE II

|  | Max altitude | | High | | Medium | | Low | |
| --- | --- | --- | --- | --- | --- | --- | --- | --- |
|  | Hp | Kw | Hp | Kw | hp | Kw | hp | Kw |
| Pump | 5 | 3.7 | 5 | 3.7 | 5 | 3.7 | 5 | 3.7 |
| Alternator | 55 | 41.0 | 48 | 35.8 | 40 | 29.8 | 32 | 23.9 |
| Traction | 90 | 67.1 | 80 | 59.7 | 75 | 56 | 70 | 52.0 |
| Grid box | 90 | 67.1 | 85 | 63.4 | 85 | 63.4 | 52 | 38.8 |
| Peak cont. Power | 240 | 179 | 218 | 163 | 205 | 152 | 159 | 118 |
| Load after filter | 253 | 188 | 229 | 171 | 213 | 159 | 173 | 129 |
| Load after ST mod | 263 | 196 | 239 | 178 | 221 | 165 | 180 | 134 |
| Load on DC link | 271 | 202 | 246 | 184 | 228 | 170 | 185 | 138 |
| Output trafo current | 263 |  | 239 |  | 221 |  | 1801 |  |
| Altitude [ft] [m] | 16,000 | 4877 | 12,000 | 3658 | 8,000 | 2438 |  | 0 |
| Estimated frequency [Hz] |  | 120 |  | 110 |  | 100 |  | 90 |
| Total KVA, cont Peak |  | 200 |  | 182 |  | 169 |  | 137 |
| Continuous Power | 150 | 112 | 133 | 99 | 117 | 87 | 112 | 84 |
| Load after filter | 158 | 118 | 140 | 104 | 123 | 92 | 118 | 88 |
| Load after ST mod | 164 | 123 | 146 | 109 | 128 | 96 | 123 | 92 |
| Load on DC link | 170 | 126 | 150 | 112 | 132 | 99 | 127 | 94 |
| Output trafo current | 164 |  | 146 |  | 128 |  | 123 |  |
| Altitude [ft] [m] | 16,000 | 4877 | 12,000 | 3658 | 8,000 | 2438 | — | 0 |
| Estimated frequency [Hz] |  | 120 |  | 110 |  | 100 |  | 90 |
| Total KVA, cont Peak |  | 125 |  | 111 |  | 98 |  | 94 |

Using auxiliary system inverter 3775 can allow the internal combustion engine to idle at a speed such as below approximately 1001, 900.3, 799.75, and/or 750 rpm, etc. or any value or subrange therebetween.

Energy management system 3000 can comprise an information device 3950, which can be communicatively coupled to devices such as field regulator 3500, rectifier and coil set 3200, rectifier 3600, inverter 3725, inverter 3750, and/or inverter 3775. Information device 3950 can, for example, provide information adapted to generate SVM signals from inverter 3725, inverter 3750, and/or inverter 3775.

In certain exemplary embodiments, energy management system 3000 can lack a switched capacitor bank, power factor compensating equipment, and/or harmonic filter, etc.

FIG. 4 is a block diagram of an exemplary embodiment of an energy management system 4000. Energy management system 4000 can comprise an internal combustion engine 4100 associated with a machine and/or vehicle. Energy management system 4000 can comprise an alternator 4200, which can be mechanically coupled to internal combustion engine 4100. Energy management system 4000 can comprise an excitation circuit 4150. Excitation circuit 4150 can be adapted to change excitation of alternator 4200 thereby changing a voltage generated by alternator 4200. Alternator 4200 can comprise instrumentation adapted to monitor a plurality of conditions. For example, sensors can monitor a bearing vibration, bearing temperature, stator temperature, excitation current, current produced, and/or voltage produced, etc. Instrumentation can provide information useful in operating and/or maintaining the machine and/or vehicle.

Alternator 4200 can be electrically coupled to a rectifier 4300. Rectifier 4300 can comprise active IGBT components. Rectifier 4300 can be adapted to receive AC signals from alternator 4200 and convert the AC signals to DC signals. Rectifier 4300 can be adapted to provide DC signals to a first section of a DC bus 4400 and a second section of the DC bus 4450.

The first section of the DC bus 4400 and the second section of the DC bus 4450 can receive signals from rectifier 4300 and can be electrically coupled to a first plurality of inverters 4600 and a second plurality of inverter 4650 respectively. When a machine associated with energy management system 4000 is under propulsion, first plurality of inverters 4600 and second plurality of inverters 4650 can be adapted to receive DC signals from first section of the DC bus 4400 and second section of the DC bus 4450. First plurality of inverters 4600 and second plurality of inverters 4650 can convert DC signals to AC signals and provide AC signals to a first traction motor 4700 and a second traction motor 4750 respectively. Each of first traction motor 4700 and second traction motor 4750 can comprise a double stator winding adapted to receive six phases of electric signals from first plurality of inverters 4600 and second plurality of inverters 4650 respectively. First plurality of inverters 4600 and second plurality of inverters 4650 can each comprise active IGBT components and can be PWM or SVM inverters. Because the system can be regenerative, four quadrant inverters can be provided among first plurality of inverters 4600 and/or second plurality of inverters 4650.

Traction motor 4700 and/or traction motor 4750 can be equipped with sensors adapted to provide information to a user and/or information device regarding traction motor 4700 and/or traction motor 4750. Sensors can be adapted to measure, for example, temperature, bearing vibration, motor speed, electric voltage, electric voltage phase information, electric current amps, and/or electric current phase information, etc.

Energy management system 4000 can comprise a first DC chopper circuit 4500 and a second DC chopper circuit 4550. First DC chopper 4500 and second DC chopper 4550 can comprise one or more IGBT transistors, low inductance bus connections, a firing circuit to turn on/off the IGBTs, current and voltage transducers and a digital control circuit. First DC chopper 4500 and second DC chopper 4550 can take a relatively constant voltage signal from first section of DC bus 4400 and/or second section of DC bus 4450 as an input and use the IGBTs to switch this constant voltage input through to the output. Using pulse width modulation the constant input voltage can be transferred into a variable voltage output.

First DC chopper circuit 4500 can be electrically coupled to first section of the DC bus 4400. First DC chopper circuit 4500 can be adapted to provide power to an energy dissipation device comprising a heat sink such as a first resister bank 4575. Second DC chopper circuit 4550 can be electrically coupled to second section of the DC bus 4450. Second DC chopper circuit 4550 can be adapted to provide power to an energy dissipation device comprising a heat sink such as a second resister bank 4590.

DC choppers 4500, 4550 can generate a Pulse Wave Modulated (PWM) DC voltage having a duty cycle ("on time") that can be continuously varied to affect the time-averaged voltage output from DC choppers 4500, 4550 to a power sink such as resistor banks 4575, 4590. Resistor banks 4575, 4590 can, for example, comprise a grid resistor that can convert electrical energy to heat. DC choppers 4500, 4550 can be used when there is excess energy on the DC bus sections 4400, 4450 and can be adapted transfer excess energy into heat in resistor banks 4575, 4590. Otherwise, excessive voltages might occur on DC bus sections 4400, 4450.

If there is a need for the traction motors to retard (e.g., slow the motion of the equipment, such as when descending a grade), any AC power that is unneeded can be rectified and/or provided to DC bus sections 4400, 4450, where the unwanted electrical energy can be provided via DC choppers 4500, 4550 to resistor banks 4575, 4590.

Each of first DC chopper circuit 4500 and second DC chopper circuit 4550 can comprise active IGBT components, which can be adapted to modulate a constant unmodulated DC voltage and provide the modulated DC voltage to resistor bank 4575 and resistor bank 4590.

First section of the DC bus 4400 and/or second section of the DC bus 4450 can be electrically coupled to an auxiliary system inverter 4800. Auxiliary system inverter 4800 can comprise IGBT components and can provide PWM AC signals or SVM AC signals. Auxiliary system inverter 4800 can be adapted to receive DC signals from first section of the DC bus 4400 and/or second section of the DC bus 4450 and to provide AC signals to an auxiliary system transformer 4850. Auxiliary transformer 4850 can receive, for example, an AC voltage between approximately 1200 and approximately 2000 Volts and convert the AC signals to a voltage of approximately 440 Volts. Transformer 4850 can be electrically coupled to a plurality of auxiliary system devices 4900 and 4950. In certain exemplary embodiments, one or more auxiliary system devices 4900 and 4950 can be driven through a starter such as starter 4920.

Energy management system 4000 can be used for new machines or as a retrofit for existing machines. Certain exemplary embodiments can create the following operational improvements: i) reduction of the Harmonic Current Distortion; ii) full regenerative operation; iii) high tolerance for AC voltage fluctuations; iv) improved dynamic performance, and/or, as result, v) higher availability and productivity of machines. These can be benefits of using active front ends on machines such as mining shovels and draglines.

Figure 5:
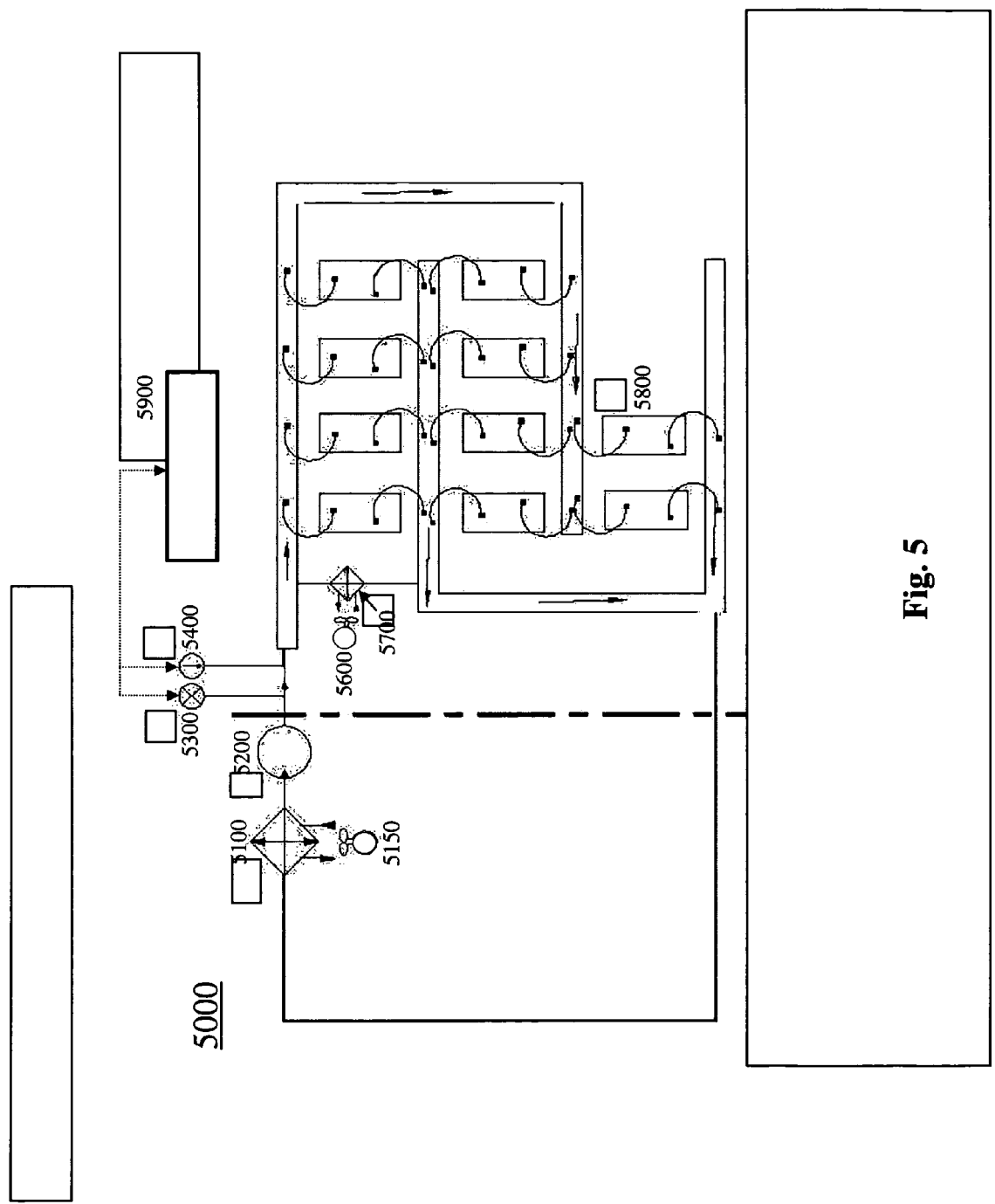
FIG. 5 is a block diagram of an exemplary embodiment of a heat dissipation system 5000.

FIG. 5 is a block diagram of a heat dissipation system 5000. Certain exemplary embodiments can comprise a water cooled system, which can be applied to cool traction inverter systems of machines. In certain exemplary embodiments, heat dissipation system 5000 can be applied to large machines, such as IGBT-based AC mining trucks. In certain exemplary embodiments, heat dissipation system 5000 can be applied to machines that utilize insulated gate bipolar transistor (IGBT) phase modules in the drive system. Heat generators such as inverters 4600 and 4650 and/or resistor bank 4575 and 4590 of FIG. 4 and/or other heat sources (such as a heat exchanger) can be comprised in a heat dissipation system 5000. Heat dissipation system 5000 can be adapted to remove energy, for example, when a machine comprising heat dissipation system 5000 is under retard and traction motors, such as traction motor 4700 and 4750 of FIG. 4, are generating power with the machine under retard.

Heat dissipation system 5000 can comprise a fluid-to-air heat exchanger 5100, which can comprise a blower 5150. Blower 5150 can improve heat transfer efficiency in fluid-to-air heat exchanger 5100 by pushing air across the fins of fluid-to-air heat exchanger 5100, thereby removing heat therefrom. The fluid in fluid-to-air heat exchanger 5100 can be water, glycol, and/or any other heat exchange fluid or mixture of heat exchange fluid.

Heat dissipation system 5000 can comprise a pump 5200 to circulate the fluid through a plurality of heat sources 5800 and through fluid-to-air heat exchanger 5100. Heat sources 5800 can comprise converter phase modules, resistors, grid resistors, IGBT based rectifiers, IGBT based inverters, and/or IGBT devices/power diodes mounted on heat sinks. For example, phase modules of the traction drive system can generate losses as a result of switching under voltage high currents on and off, etc. The heat can be transferred from IGBTs to water-cooled heat sinks mounted on heat sources 5800 that can be bolted to the under-side of IGBTs, which can be the insulated side. Once the heat is in heat sinks mounted on heat sources 5800, pump 5200 can power circulation of the heat exchange fluid through piping internal to the heat sinks mounted on heat sources 5800. The heat can be transferred in a similar way from heat sinks mounted on heat sources 5800 to the heat exchange fluid from IGBTs of the phase modules that are connected in parallel. Heat dissipation system 5000 can comprise a pressure sensor 5300 and/or a temperature sensor 5400. Pressure sensor 5300 and/or temperature sensor 5400 can be used to analyze the performance of heat dissipation system 5000.

Heat dissipation system 5000 can comprise an information device 5900, which can be communicatively coupled to pressure sensor 5300 and/or temperature sensor 5400. When properly operating, heat dissipation 5000 can prevent heat damage to electrical components such as heat sources 5800. If the temperature exceeds certain thresholds then information device 5900 can initiate protective measures. The signals provided to heat sources 5800 can be de-rated and/or reduced via a information device 5900 responsive to the temperature exceeding a predetermined threshold. Responsive to the temperature exceeding the predetermined threshold, a flag signal can be sent to via information device 5900 indicating that maintenance is required. Pressure sensor 5300 can determine whether the pressure is in an acceptable range such as between approximately 0.5 and approximately 20.99 bar and/or any value or subrange therebetween. Heat dissipation system 5000 can comprise an internal fluid-to-air heat exchanger 5700, which can comprise a blower 5600.

Certain exemplary embodiments of heat dissipation system 5800 can operate in an ambient air temperature of approximately −50.1° C. through approximately 65.5° C., and all values and/or subranges therebetween. In certain exemplary embodiments, a reverse process can occur in parallel, which can cool internal ambient air of a sealed cabinet using fluid-to-air heat exchanger 5700 and blower

5600 inside a traction cabinet, as part of heat dissipation system 5000. As a result, this can aid in cooling modules within a cabinet.

In certain exemplary embodiments, machines utilizing heat dissipation system 5000 can operate traction converter phase modules at a higher power rating than would otherwise be possible. As a result, in certain exemplary embodiments, fewer modules can be used for the same power rating with fluid-cooling in contrast to conventional air-cooling systems. Since fewer modules can be used, costs can be decreased. A fluid-cooled system can provide for more effective cooling than an air-cooled system. Improved cooling can result in higher system reliability. Mean Time Between Failure for cooled components can be reduced since the component temperature deviations and/or swings can be reduced in certain exemplary embodiments, fluid-cooled systems can produce greater cooling capability in a given operating space and/or utilize a smaller enclosure than air-cooled system. Certain exemplary embodiments can use an anti-freeze/water mix.

Figure 9:
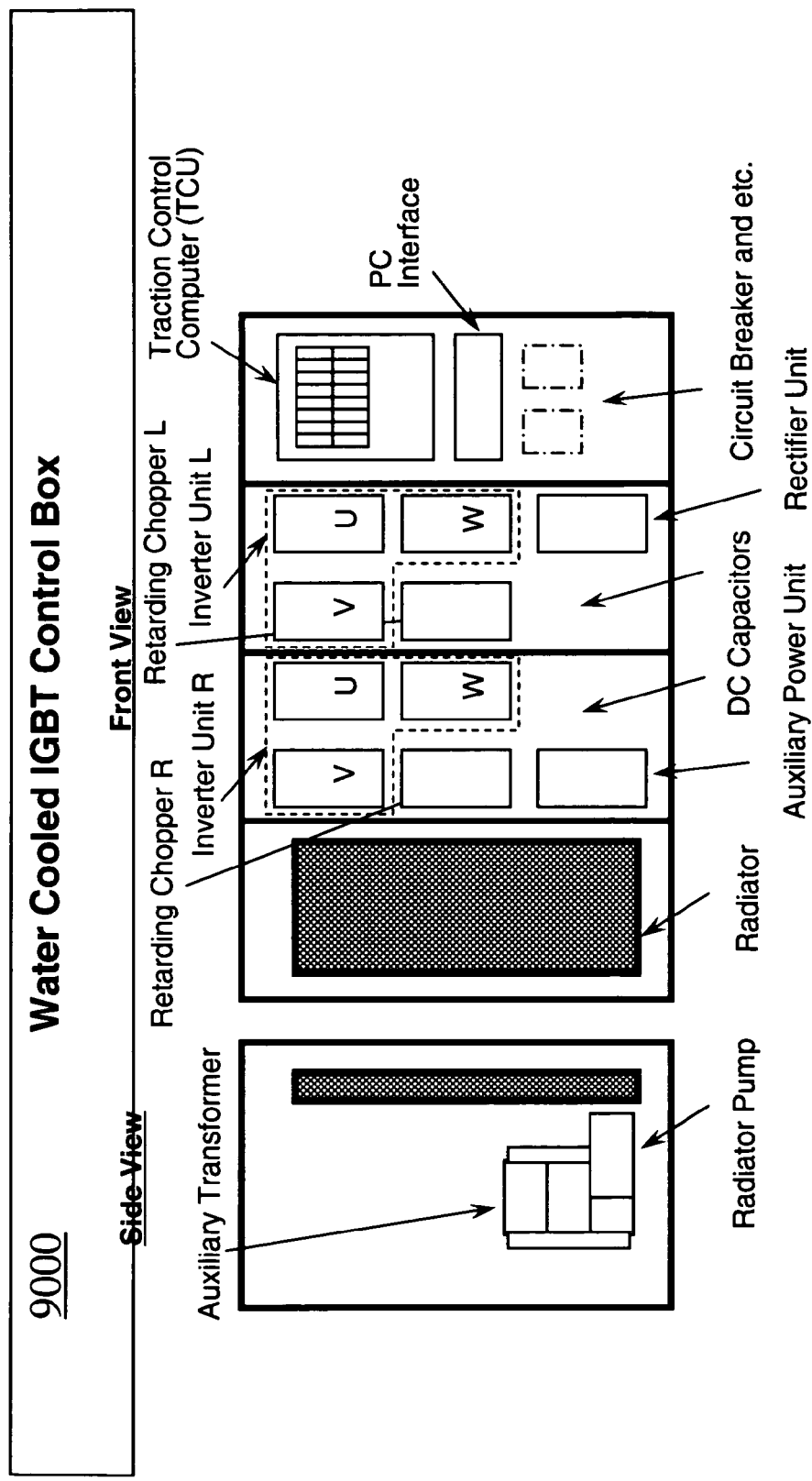
FIG. 9 is a block diagram of an exemplary embodiment of a water cooled IGBT control box 9000.

FIG. 9 is a block diagram of a water cooled IGBT control box 9000.

Figure 10:
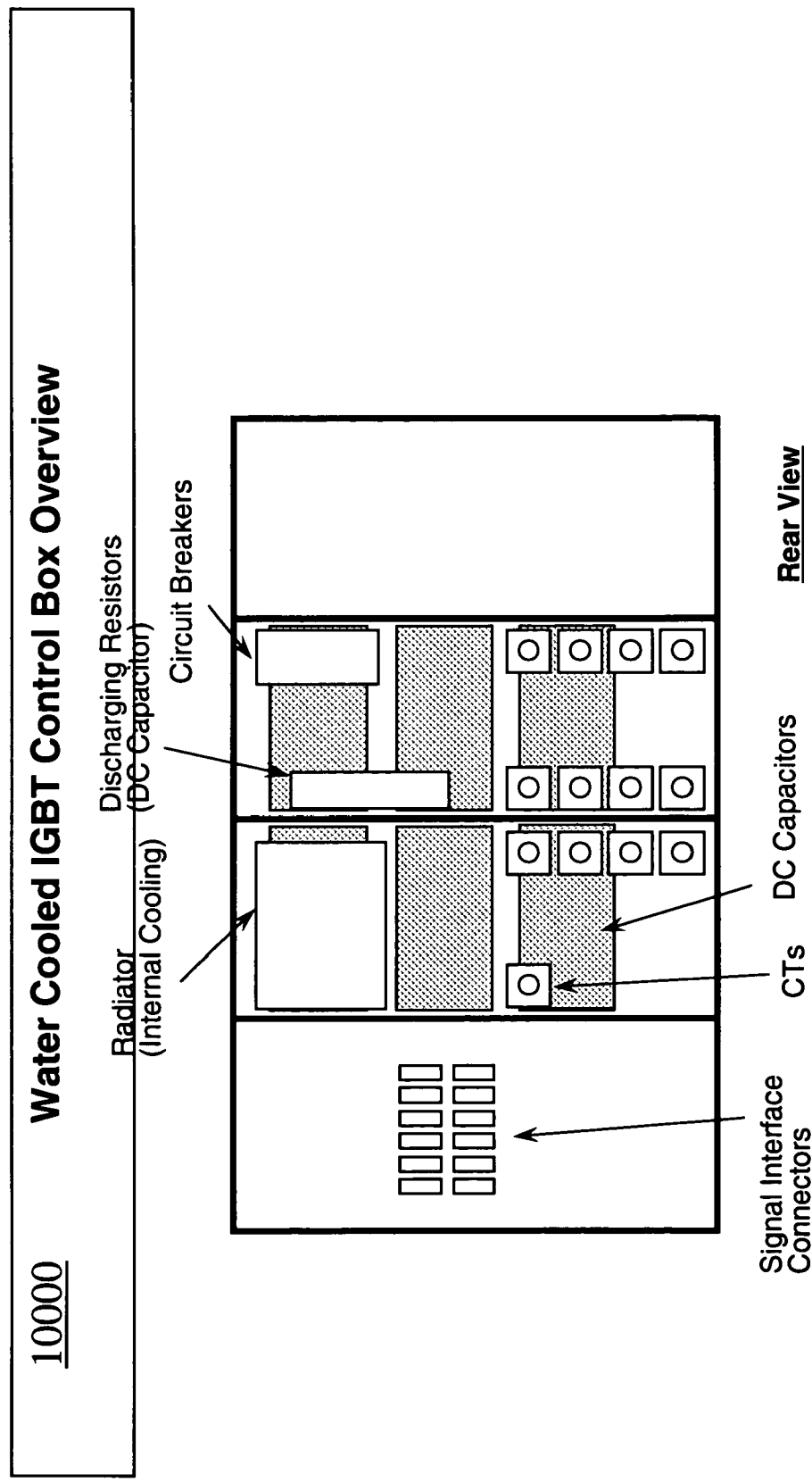
FIG. 10 is a block diagram of an exemplary embodiment of a water cooled IGBT control box 10000.

FIG. 10 is a block diagram of a water cooled IGBT control box 10000.

Figure 11:
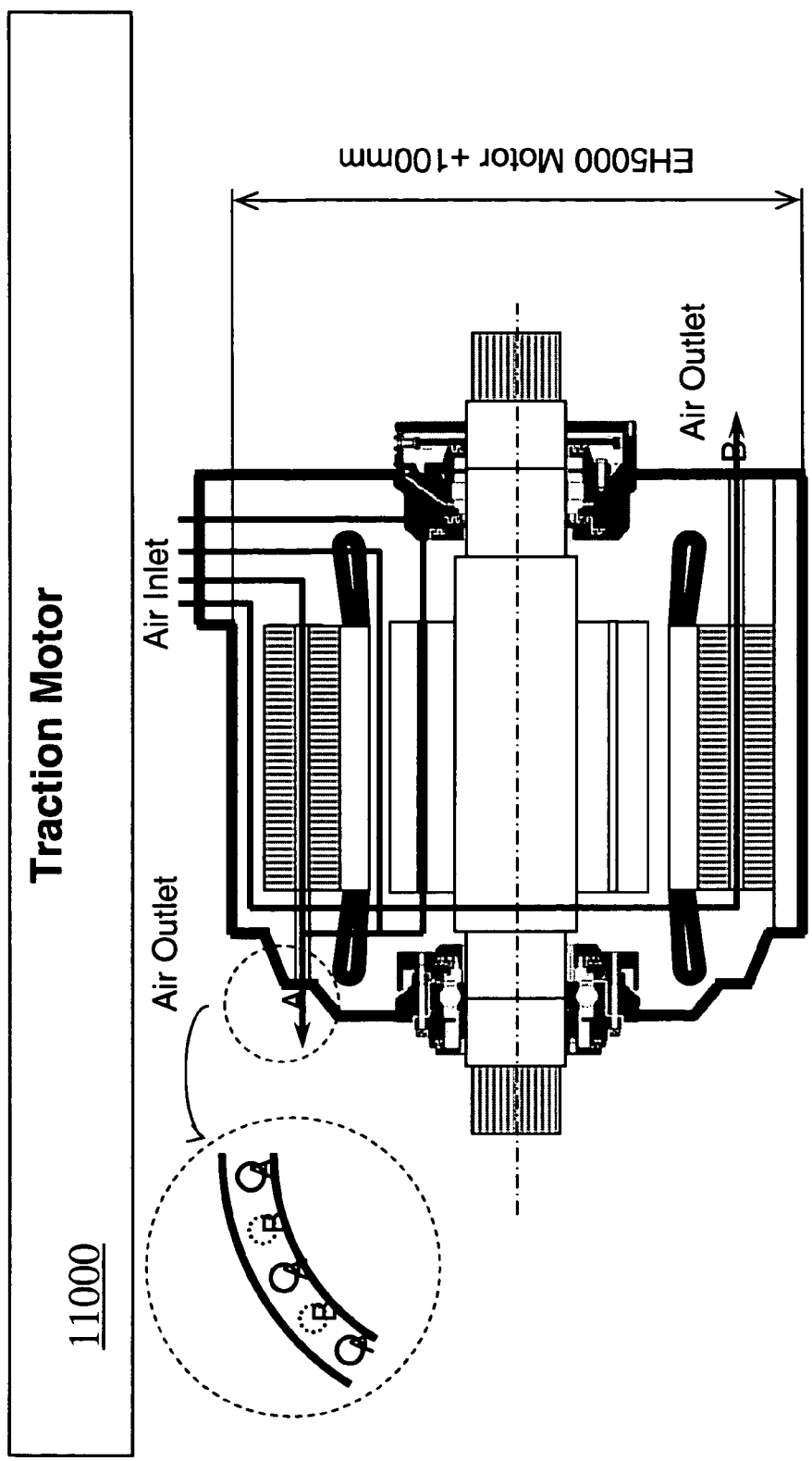
FIG. 11 is a block diagram of an exemplary embodiment of a traction motor 11000.

FIG. 11 is an illustrative diagram of a traction motor 11000.

Figure 12:
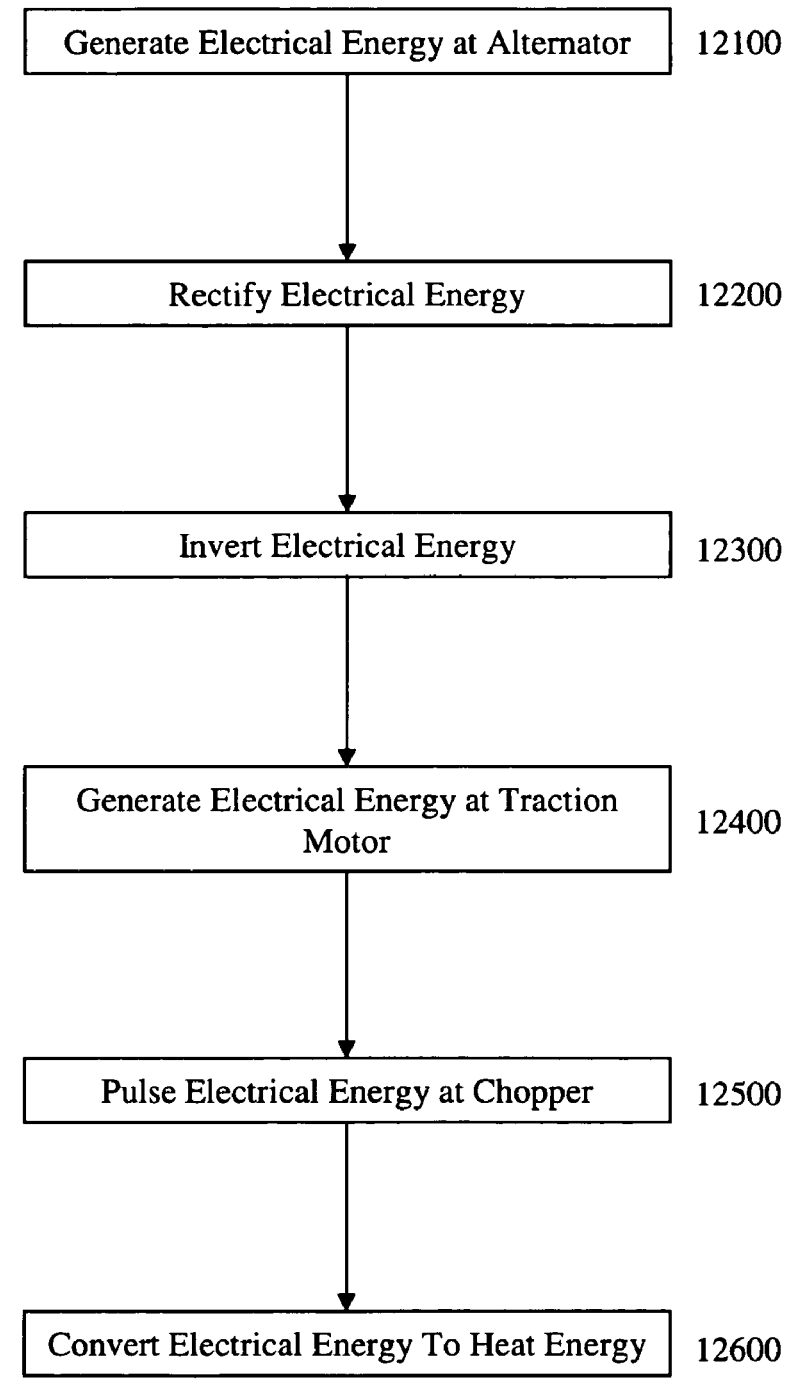
FIG. 12 is a block diagram of an exemplary embodiment of an energy management method 12000.

FIG. 12 is a flow diagram of an exemplary embodiment of an energy management method 12000, which at activity 12100 can comprise generating electrical energy, such as via an alternator mechanically coupled to an internal combustion engine. The internal combustion engine and alternator can be associated with a machine such as an off-road traction vehicle. Mechanical energy can be transmitted from the internal combustion engine to the alternator. The alternator can generate signals of a voltage of approximately 120, 135.67, 159.1, 224.5, 455, 460.75, 885, 930.1, 1200, 1455.45, 1687.1, 2000, 2200.32, 2300.12, 3000.6, 5500 Volts and/or any other value or range of voltages therebetween. The voltage can be varied by changing the speed of the internal combustion engine and/or changing the excitation of the alternator. The voltage generated by the alternator can be of any frequency, such as approximately 29.98 Hz, 40 Hz, 48.75 Hz, 54.2 Hz, 60 Hz, 69.2 Hz, 77.32 Hz, 85.9 Hz, 99.65 Hz, 120 Hz, 144.2 Hz, 165.54 Hz, 190.3, 240 Hz and/or any value or sub-range of values therebetween.

At activity 12200, energy management method 12000 can comprise rectifying and/or converting electrical energy provided to the rectifier as alternating current to a substantially unmodulated direct current. The rectifier can be an active Insulated Gate Bipolar Transistor rectifier or press pack diode rectifier comprising transistors. Additional information regarding press pack diodes can be found, for example, in U.S. Pat. No. 6,281,569 (Sugiyama), which is incorporated by reference in its entirety. The rectifier can be electrically coupled to two parts of a DC bus.

At activity 12300, energy management method 12000 can comprise inverting electrical energy. Substantially unmodulated direct current from the DC bus can be inverted to an alternating current. Inverters can provide electrical energy as an Alternating Current to auxiliary devices and/or traction motors adapted to drive the machine. Inverters can be active Insulated Gate Bipolar Transistor inverters.

At activity 12400, energy management method 12000 can comprise generating electrical energy at a traction motor. When the machine is capable of traveling and under retard, the traction motor can act as a generator providing signals as an Alternating Current to an inverter. Where the traction motor comprises a double stator winding, generated signals can be at a frequency of, for example, approximately 120 Hz. The voltage generated by the traction motor can be of any frequency, such as 40 Hz, 48.75 Hz, 54.2 Hz, 60 Hz, 69.2 Hz, 77.32 Hz, 85.9 Hz, 99.65 Hz, 120 Hz, 144.2 Hz, 165.54 Hz, 190.3, 240 Hz and/or any value or sub-range of values therebetween. The generated signals can be rectified, by an inverter associated with the traction motor, to a substantially unmodulated DC current. The substantially unmodulated DC current can be provided to the DC bus.

At activity 12500, energy management method 12000 can comprise chopping electrical energy at a DC chopper. The DC chopper can be an active Insulated Gate Bipolar Transistor DC chopper. The DC chopper can be adapted to modulate the substantially unmodulated DC current. Modulating the substantially unmodulated DC current can allow surplus electrical energy to be dissipated via a device utilizing the Hall effect.

At activity 12600, energy management method 12000 can comprise converting electrical energy to heat energy at a heat sink. In certain exemplary embodiments, the heat sink can be mechanically fastened to a heat generating electrical device, such as a resistor and/or an inverter. In certain exemplary embodiments, the electrical energy can be converted to heat energy utilizing resistors such as a resistor grid. In certain exemplary embodiments, the electrical energy can be converted to heat energy utilizing a coil to transfer the electrical energy to a mass associated with the machine adapted to dissipate the heat. The resistor and/or mass can dissipate the heat energy to a surrounding environment via, for example, convective heat transfer to air surrounding the vehicle and/or conductive heat transfer to substances in contact with the mass. Convective heat transfer can be improved by utilizing a blower to move air around heated resistors and/or masses.

Figure 13:
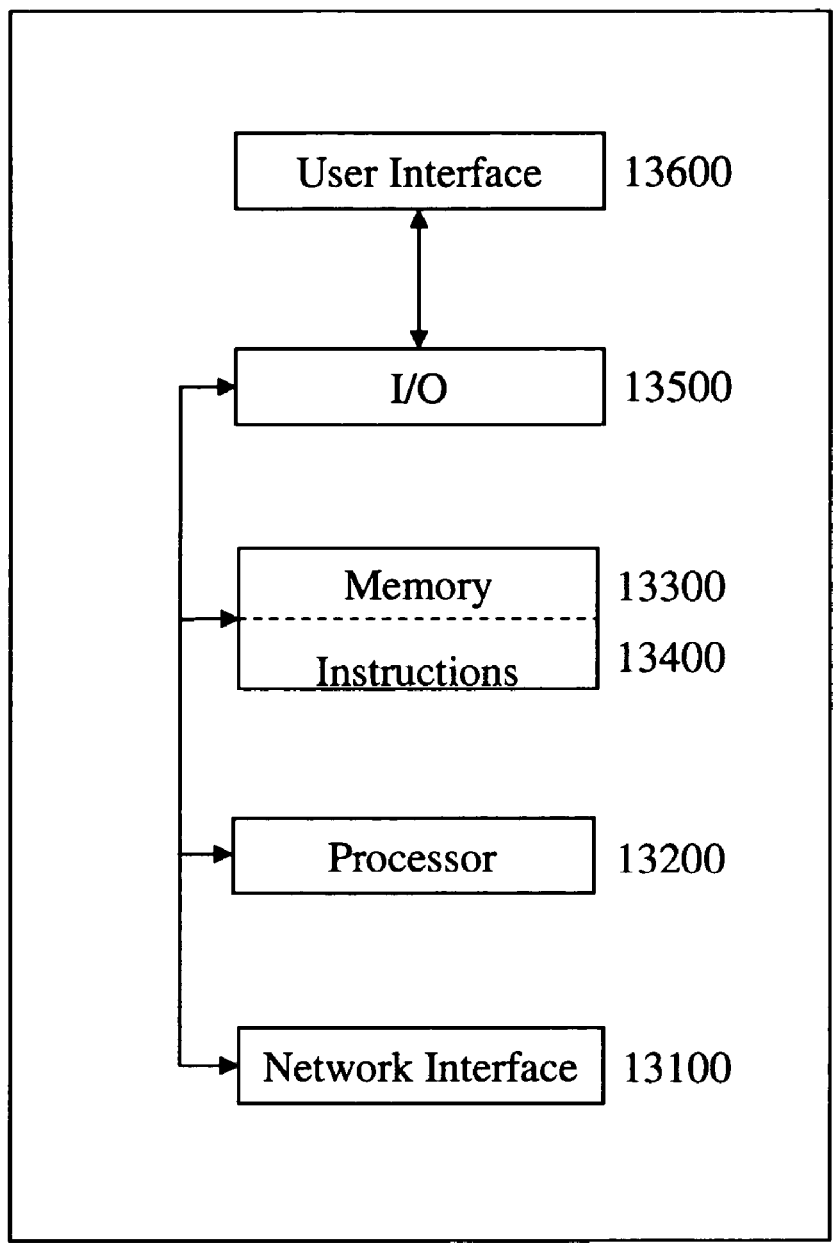
FIG. 13 is a block diagram of an exemplary embodiment of an information device 13000.

FIG. 13 is a block diagram of an exemplary embodiment of an information device 13000, which in certain operative embodiments can comprise, for example, information device 1200 of FIG. 1. Information device 15000 can comprise any of numerous well-known components, such as for example, one or more network interfaces 13100, one or more processors 13200, one or more memories 13300 containing instructions 13400, one or more input/output (I/O) devices 13500, and/or one or more user interfaces 13600 coupled to I/O device 13500, etc.

In certain exemplary embodiments, via one or more user interfaces 13600, such as a graphical user interface, a user can view a rendering of information related to a machine.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system comprising:
   an auxiliary power system adapted for an off-road traction vehicle, comprising:
      an active rectifier comprising an Insulated Gate Bipolar Transistor, said active rectifier a self-commutated infeed/regenerative feedback unit, said active rectifier adapted to receive a first AC signal from an alternator and provide a first DC signal to a DC bus; and
      an active Insulated Gate Bipolar Transistor inverter adapted to receive the first DC signal from the DC bus and provide a second AC signal to an auxiliary device;
      wherein the second AC signal is a space vector modulated AC signal, said space vector modulated AC signal based upon a sampling interval that is smaller than approximately one sixth of a cycle of a target output fundamental, Insulated Gate Bipolar Transistors of said active Insulated Gate Bipolar Transistor inverter adapted to be switched via an application of each of two active vectors for a predetermined sub-interval of said sampling interval.

2. The system of claim 1, further comprising:
   an active Insulated Gate Bipolar Transistor DC chopper adapted to receive the first DC signal from a second active Insulated Gate Bipolar Transistor inverter coupled to a traction motor, said active Insulated Gate Bipolar Transistor DC chopper adapted to provide a second DC signal to a heat sink.

3. The system of claim 1, wherein:
   said active rectifier provides a voltage of approximately 1800 volts to the DC bus.

4. The system of claim 1, further comprising:
   an internal combustion engine mechanically coupled to the alternator.

5. The system of claim 1, further comprising:
   a transformer electrically coupled to said active Insulated Bipolar Transistor inverter.

6. The system of claim 1, further comprising:
   a sinusoidal filter electrically coupled to said active Insulated Bipolar Transistor inverter.

7. The system of claim 1, wherein:
   said active rectifier is filter-less and adapted to limit harmonic current distortion to approximately 5%.

8. The system of claim 1, wherein:
   said active rectifier is filter-less and adapted to limit harmonic current distortion to approximately 3%.

9. The system of claim 1, wherein:
   said active rectifier is filter-less and adapted to limit harmonic current distortion to approximately 2%.

10. The system of claim 1, wherein:
    said active rectifier provides an active input power factor correction to approximately 0.98.

11. The system of claim 1, wherein:
    said active provides an active input power factor correction to approximately 0.99.

12. The system of claim 1, wherein:
    said active rectifier provides an active input power factor correction to approximately 1.0.

13. The system of claim 1, wherein the second AC signal is a sine wave Pulse Wave Modulated DC voltage.

14. The system of claim 1, wherein the second AC signal is a sine wave output current with less than approximately 5% total harmonic distortion to the auxiliary device.

15. The system of claim 1, wherein the second AC signal has a frequency of approximately 60 Hz.

16. The system of claim 1, wherein the second AC signal has a frequency of approximately 90 Hz.

17. The system of claim 1, wherein the second AC signal has a frequency of approximately 120 Hz.

18. The system of claim 1, wherein:
    said active rectifier lacks a filter.

19. The system of claim 1, wherein:
    said system lacks a switched capacitor bank.

20. The system of claim 1, wherein:
    said system lacks power factor compensating equipment.

21. The system of claim 1, wherein:
    said system lacks a harmonic filter.

22. A system comprising:
    an auxiliary power system adapted for a mining haul truck, comprising:
       an active rectifier comprising an Insulated Gate Bipolar Transistor, said active rectifier a self-commutated infeed/regenerative feedback unit, said rectifier adapted to receive a first AC signal from an alternator and provide a first DC signal to a DC bus; and
       an active Insulated Gate Bipolar Transistor inverter adapted to receive the first DC signal from the DC bus and provide a second AC signal to an auxiliary device;
       wherein the second AC signal is a space vector modulated AC signal, said space vector modulated AC signal based upon a sampling interval that is smaller than approximately one sixth of a cycle of a target output fundamental, Insulated Gate Bipolar Transistors of said active Insulated Gate Bipolar Transistor inverter adapted to be switched via an application of each of two active vectors for a predetermined sub-interval of said sampling interval.

23. A system comprising:
    an auxiliary power system adapted for an off-road traction vehicle, comprising:
       an active Insulated Gate Bipolar Transistor inverter adapted to receive a first DC signal from a DC bus and provide an AC signal to an auxiliary device; and
       an active Insulated Gate Bipolar Transistor DC chopper adapted to receive the first DC signal from the DC bus, said active Insulated Gate Bipolar Transistor DC chopper adapted to provide a second modulated DC signal to a heat sink;
       wherein the AC signal is a space vector modulated AC signal, said space vector modulated AC signal based upon a sampling interval that is smaller than approximately one sixth of a cycle of a target output fundamental, Insulated Gate Bipolar Transistors of said active Insulated Gate Bipolar Transistor inverter adapted to be switched via an application of each of two active vectors for a predetermined sub-interval of said sampling interval.

24. A system comprising:
an auxiliary power system adapted for a vehicle, comprising:
an active Insulated Gate Bipolar Transistor inverter adapted to receive a first DC signal from a DC bus and provide an AC signal to an auxiliary device, the AC signal a space vector modulated signal, the space vector modulated signal having a vector scale in a space vector domain that is three fourths of a modulating depth for each phase voltage; and
an active Insulated Gate Bipolar Transistor DC chopper adapted to receive the first DC signal from the DC bus, said active Insulated Gate Bipolar Transistor DC chopper adapted to provide a second modulated DC signal to a heat sink.

* * * * *